United States Patent
Höglund et al.

(10) Patent No.: US 11,882,548 B2
(45) Date of Patent: Jan. 23, 2024

(54) FALLBACK FOR RANDOM ACCESS EARLY DATA TRANSMISSION

(71) Applicant: Telefonaktiebolaget LM Ericsson (publ), Stockholm (SE)

(72) Inventors: Andreas Höglund, Solna (SE); Johan Bergman, Stockholm (SE); Magnus Stattin, Upplands Väsby (SE); Tuomas Tirronen, Helsinki (FI); Emre Yavuz, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 55 days.

(21) Appl. No.: 17/054,044

(22) PCT Filed: May 9, 2019

(86) PCT No.: PCT/IB2019/053845
§ 371 (c)(1),
(2) Date: Nov. 9, 2020

(87) PCT Pub. No.: WO2019/215675
PCT Pub. Date: Nov. 14, 2019

(65) Prior Publication Data
US 2022/0039068 A1    Feb. 3, 2022

Related U.S. Application Data

(60) Provisional application No. 62/669,818, filed on May 10, 2018.

(51) Int. Cl.
*H04W 4/00* (2018.01)
*H04W 72/04* (2023.01)
(Continued)

(52) U.S. Cl.
CPC ....... *H04W 72/042* (2013.01); *H04W 74/008* (2013.01); *H04W 74/0833* (2013.01); *H04W 76/20* (2018.02)

(58) Field of Classification Search
CPC . H04W 72/042; H04W 76/20; H04W 74/008; H04W 74/0833
See application file for complete search history.

(56) References Cited

U.S. PATENT DOCUMENTS

2009/0316593 A1* 12/2009 Wang ................ H04W 74/0833
                                                             370/252
2016/0345118 A1* 11/2016 Oh ......................... H04B 1/713
(Continued)

FOREIGN PATENT DOCUMENTS

| EP | 3 244 674 A1 | 11/2017 |
| WO | 2013 042908 A1 | 3/2013 |
| WO | 2018 059438 A1 | 4/2018 |

OTHER PUBLICATIONS

3GPP TSG-RAN WG2 Meeting #92; Anaheim, America; Source: Huawei, HiSilicon; Title: Remaining RACH issues for eMTC (R2-156468)—Aug. 16-20, 2015.
(Continued)

*Primary Examiner* — Siren Wei
(74) *Attorney, Agent, or Firm* — BAKER BOTTS L.L.P.

(57) ABSTRACT

A method by a wireless device includes obtaining, in a downlink control information (DCI) field, an indication of whether to perform a fallback to a radio resource control (RRC) connection setup or resume procedure or whether to abort a random access attempt. Based on the indication, wireless device determines to perform the fallback to the RRC connection setup or resume procedure or to abort the random access attempt.

20 Claims, 15 Drawing Sheets

(51) Int. Cl.
*H04W 76/20* (2018.01)
*H04W 74/00* (2009.01)
*H04W 74/08* (2009.01)

(56) References Cited

U.S. PATENT DOCUMENTS

| | | | | |
|---|---|---|---|---|
| 2018/0324854 | A1* | 11/2018 | Phuyal | H04W 74/085 |
| 2019/0104564 | A1* | 4/2019 | Johansson | H04W 76/30 |
| 2019/0208411 | A1* | 7/2019 | Shrestha | H04L 9/0861 |
| 2019/0215872 | A1* | 7/2019 | Park | H04W 74/0833 |
| 2020/0037367 | A1* | 1/2020 | Kim | H04W 74/006 |
| 2020/0059390 | A1* | 2/2020 | Zhang | H04W 72/14 |
| 2020/0187245 | A1* | 6/2020 | Fujishiro | H04W 52/0229 |
| 2021/0058972 | A1* | 2/2021 | Choe | H04W 74/0833 |

OTHER PUBLICATIONS

PCT International Search Report issued for International application No. PCT/IB2019/053845—dated Aug. 20, 2019.
PCT Written Opinion of the International Searching Authority issued for International application No. PCT/IB2019/053845—dated Aug. 20, 2019.
3GPP TS 36.213 v14.6.0; 3rd Generation Partnership Project; Technical Specification Group Radio Access Network; Evolved Universal Terrestrial Radio Access (E-UTRA); Physical layer procedures (Releae 14)—Mar. 2018.
3GPP TSG RAN Meeting #77; Lisbon, Portugal; Source: Ericsson, Qualcomm; Title: Revised WID on Even further enhanced MTC for LTE (RP-172811)—Dec. 18-21, 2017.
3GPP TSG RAN Meeting #77; Sapporo, Japan; Source: Huawei, HiSilicon; Title: Revised WID on Further NB-IoT enhancements (RP-172063)—Sep. 11-14, 2017.
ETSI TS 136 212 v14.5.1; LTE; Evolved Universal Terrestrial Radio Access (E-UTRA); Multiplexing and channel coding (3GPP Ts 36.212 version 14.5.1 Release 14)—Jan. 2018.
3GPP TS 36.321 v14.6.0; 3rd Generation Partnership Project; Technical Specification Group Radio Access Network; Evolved Universal Terrestrial Radio Access (E-UTRA); Medium Access Control (MAC) protocol specification (Release 14)—Mar. 2018.
3GPP TS 36.331 v14.6.2; 3rd Generation Partnership Project; Technical Specification Group Radio Access Network; Evolved Universal Terrestrial Radio Access (E-UTRA); Radio Resource Control (RRC); Protocol specification (Release 14)—Apr. 2018.
3GPP TSG-RAN2 Meeting #101bis; Sanya, China; Change Request; 36.331 CR CRNum rev—Current version 15.1.0; Title: Introduction of EDT for eMTC and NB-IoT enhancements (R2-1804331)—Apr. 16-20, 2018.

* cited by examiner

FALLBACK FOR RANDOM ACCESS EARLY DATA TRANSMISSION

PRIORITY

This nonprovisional application is a U.S. National Stage Filing under 35 U.S.C. § 371 of International Patent Application Serial No. PCT/IB2019/053845 filed May 9, 2019 and entitled "FALLBACK FOR RANDOM ACCESS EARLY DATA TRANSMISSION" which claims priority to U.S. Provisional Patent Application No. 62/669,818 filed May 10, 2018 both of which are hereby incorporated by reference in their entirety.

BACKGROUND

Current Third Generation Partnership Project (3GPP) activity includes Machine-to-Machine (M2M) and/or Internet of Things (IoT) related use cases, such as enhancements to support Machine-Type Communications (MTC) with new user equipment (UE) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2). The long term evolution (LTE) enhancements introduced in 3GPP Release 13, 14, and 15 for MTC will be referred to herein as "LTE-M" or "eMTC", including (not limiting) support for bandwidth limited (BL) UEs such as Cat-M1/M2, and support for coverage enhancement (CE) modes. This is to separate discussions from NB-IoT (notation here used for any Release), although the supported features are similar on a general level.

For both eMTC and NB-IoT, 'CIoT EPS UP optimization' and 'CIoT EPS CP optimization' signaling reductions were included in Rel-13. The former, here referred to as UP-solution, allows the UE to resume a previously stored RRC connection (thus also known as RRC Suspend/Resume). The latter, here referred to as CP-solution, allows the transmission of user-plane data over NAS (also referred to as DoNAS).

For 3GPP Release 15, new work items (WIs) "Even further enhanced MTC for LTE (LTE_eMTC4)" [WI_eMTC] and "Further NB-IoT enhancements (NB_IOTenh2)" [WI_NBIOT] target eMTC and NB-IoT enhancements, respectively. A common goal is to reduce UE power consumption and latency through introducing possibilities to send data as early as possible during the Random Access (RA) procedure:

For eMTC, support for early data transmission includes evaluating power consumption/latency gain and specifying necessary support for DL/UL data transmission on a dedicated resource during the RA procedure (after PRACH transmission and before the RRC connection setup is completed) at least in the RRC Suspend/Resume case.

For NBIOT, support for early data transmission includes evaluating power consumption/latency gain and specifying necessary support for DL/UL data transmission on a dedicated resource during the RA procedure after NPRACH transmission and before the RRC connection setup is completed.

One agreement for early data transmission (EDT) is to support early UL data transmission in Msg4 for Rel-13 UP solution.

To facilitate the description of the presented solutions, the messages in the RA procedure are commonly referred to as message 1 (Msg1) through message 4 (Msg4). The contention-based RA procedure from 3GPP TS36.300 is illustrated in FIG. 1. EDT can be enabled for UL Msg3 only, or DL Msg4 only, or both Msg3 and Msg4 depending on actual use cases. In existing solutions for realizing the early data transmission concept for the UP solution, the UE can indicate its intention of using EDT by the way it selects the preamble in Msg1. However, this requires some sort of preamble partitioning, which has negative impact on (N)PRACH performance.

Some specifications include the following agreements regarding preamble and PRACH resource partitioning/configuration and indication of Msg3 data sizes. The UE initiates EDT in Msg1 when the size of Msg3 including the user data, which UE intends to transmit, is equal or smaller than the maximum possible transport block size (TBS) size for Msg3 broadcast per CE. PRACH partitioning for EDT indication is configured per enhanced coverage level. Segmentation may be supported. PRACH resource partitioning may not be supported to indicate the intended data size other than legacy or maximum TBS broadcast per CE. UE category is not indicated in Msg1. For EDT indication, PRACH resources can be configured as in legacy eMTC or NB-IoT with respect to physical layer resources, preambles/subcarriers. PRACH resource pool, i.e. physical layer resources, preambles/subcarriers, for EDT indication is separate from PRACH resource pool for legacy RACH procedure.

Some concerns regarding Msg3 transmission include the possible need to include relatively large amount of padding in the case the UL data size is very small. As provided in 3GPP TS 36.213, the current information in the LTE-M grant included in RAR for Msg3 transmission follows in Table 1:

TABLE 1

| DCI contents | CE mode A | CE mode B |
|---|---|---|
| Msg3 PUSCH narrowband index | $N_{NB}^{index}$ | 2 |
| Msg3 PUSCH Resource allocation | 4 | 3 |
| Number of Repetitions for Msg3 PUSCH | 2 | 3 |
| MCS | 3 | 0 |
| TBS | 0 | 2 |
| TPC | 3 | 0 |
| CSI request | 1 | 0 |
| UL delay | 1 | 0 |
| Msg3/4 MPDCCH narrowband index | 2 | 2 |
| Zero padding | $4 - N_{NB}^{index}$ | 0 |
| Total Nr-bits | 20 | 12 |

The current information in the NB-IoT grant included in RAR for Msg3 transmission, as disclosed in 3GPP TS 36.213, includes the following:

16.3.3 Narrowband random access response grant

The higher layers indicate the Nr-bit UL Grant to the physical layer, as defined in 3GPP TS 36.321 This is referred to as the Narrowband Random Access Response Grant in the physical layer.

Nr-bit=15, and the content of these 15 bits starting with the MSB and ending with the LSB are as follows:

Uplink subcarrier spacing $\Delta f$ is '0'=3.75 kHz or '1'=15 kHz—1 bit

Subcarrier indication field $I_x$ as determined in Subclause 16.5.1.1—6 bits

Scheduling delay field ($I_{Delay}$) as determined in Subclause 16.5.1 with $k_0$=12 for $I_{Delay}$=0, where NB-IoT DL subframe n is the last subframe in which the NPDSCH associated with the Narrowband Random Access Response Grant is transmitted—2 bits Msg3 repetition $N_{Rep}$ number as determine in Subclause 16.5.1.1—3 bits MCS index indicating TBS, modulation, and number of RUs for Msg3 according to Table 16.3.3-1—3 bits The redundancy version for the first transmission of Msg3 is 0.

Padding is done at the MAC sub-layer in the process of (re)building MAC PDU for Msg3. This section provides background description on how UE's MAC sub-layer (re) builds Msg3 PDU according to corresponding UL grant(s) the UE has received. This aims to facilitate the discussion of the padding issue in Msg3 in EDT as well as possible solutions.

Currently, as specified in TS 36.321 Sections 5.1 and 5.4, the UE is provided with an UL grant in Msg2, i.e., RAR message to transmit Msg3. The MAC sub-layer builds Msg3 PDU based on data from CCCH logical channel submitted by the RLC sub-layer and then stores it in the Msg3 buffer. The MAC entity obtains the PDU from Msg3 buffer and instructs the PHY layer to generate a transmission of Msg3 according to the received UL grant. Once the UE transmits Msg3, it starts mac-ContentionResolutionTimer and monitors the (N)PDCCH for receiving either Msg4 or a UL grant for Msg3 retransmission. In case the contention resolution in Msg4 is considered unsuccessful, the UE restarts the RA procedure. Note that in the subsequent RA attempts, the UE obtains the Msg3 PDU from Msg3 buffer for transmission rather than building a new one. In case of Msg3 retransmission the eNB sends the UE a new UL grant via (N)PDCCH rather than a Msg4 (before the mac-ContentionResolution-Timer expires), the UE also obtains the PDU from Msg3 buffer for retransmission using the newly provided UL grant.

In EDT, Msg3 MAC PDU may be larger or smaller than the provided UL grant. For example, when the UE receives the UL grant in Msg2 and realizes that the provided grant is not sufficient to accommodate the potential Msg3 PDU (i.e., including UL data). In this case, one possibility for UE is to fallback to transmitting legacy Msg3. However, the UL grant may be larger compared to legacy Msg3 size, resulting in unnecessary waste of resources due to padding bits. At the other extreme, UL resources may be wasted when the UL grant is larger than needed to accommodate all pending UL data. In addition, a similar situation can also happen when the UE receives a smaller or larger UL grant to (re)transmit the Msg3 PDU already stored in Msg3 buffer. The padding issue happens to some extent in both CP and UP EDT solutions.

An issue may be that the UE is allocated with, for example, 1000-bit grant for Msg3 transmission, but the actual data size is relatively much smaller such as, for example only 100 bits. The result is that the payload of 100 bits+possible headers would be padded up to 1000 bits, potentially resulting in longer transmission time (thus higher power consumption, latency) and higher system resource consumption compared to what would be needed if the provided grant would be for smaller TBS. These issues are emphasized in deep coverage due to number of repetitions required.

It is worth noting that especially uplink TX time considerably affects the UE power consumption.

Another issue is that a UE is allocated with an UL grant larger than legacy one but not sufficient to accommodate the actual data size and the UE does a fallback to legacy Msg3.

Using a larger than required UL grant for legacy Msg3, padding is needed in Msg3 MAC PDU, resulting in higher power consumption (+latency) and system resource consumption compared to what would be needed if a smaller UL grant is provided, or UE not doing a fallback to legacy Msg3, for example, by using segmentation.

NB-IoT may select from the Rel-13 NPUSCH TBS values, and it is feasible to support at least 5 MCS/TBS/RU size combinations. (RU=resource unit).

eMTC, may select from the Rel-13 PUSCH TBS values, and the maximum TBS for early data transmission in Msg3 is 1000 bits for PRACH CE levels 0 and 1 and 936 bits for PRACH CE levels 2 and 3.

NB-IoT agreements include:
- The number of MCS/TBS/RU states that can be used for EDT may be chosen from
  - Limited MCS/TBS/RU states
    - Alt. 0: 5 unused MCS/TBS/RU states and 0 bit in SIB
    - Alt. 1: As many as supported by using 1 spare bit from RAR and 0 bit in SIB
    - Alt. 2: As many as supported by using 2 spare bits from RAR and 0 bit in SIB
    - Alt. 3: As many as supported by using 2 bits in SIB and 0 spare bit in RAR
    - Alt. 4: As many as supported by using maximum TBS value in SIB and 0 spare bit in RAR
    - Alt. 5: 1 spare bit in RAR used for new/modified UL grant and 0 bit in SIB
  - Uplink subcarrier spacing field, subcarrier indication field, scheduling delay field and Msg3 repetition number field in RAR UL Grant for uplink EDT in Msg3 do not need to be changed.
  - The above applies to above Alts. 1-4

Further agreements include:

Protocol overhead (MAC/RLC/PDCP/RRC) for EDT is assumed to be 25 bytes for TBS evaluations.

The minimum possible TB size is assumed to be around 320 bits based on the values in (N)PUSCH tables.

If new UL grant format is defined, it does not need to be backwards compatible.

Same RAR format is used for EDT UEs.

The EDT UL grant shall always allow the max TB size broadcasted in system information unless the provided UL grant is for legacy Msg3.

The EDT UL grant shall allow the UE to choose an appropriate TB size, MCS, repetitions, and RUs (for NB-IoT) from a set of TB sizes provided based on the UL data. The set of possible TB sizes, MCS, repetitions, and RUs (for NB-IoT) may be provided, e.g. hardcoded in the specs.

8 possible candidate values for the maximum TB size broadcasted in system information. For each maximum TB size broadcasted, up to 4 possible TB sizes, i.e. blind decoding options, are allowed.

For eMTC, the reserved bit in MAC RAR can be used for the EDT feature in eMTC only if it is necessary.

The maximum TBS broadcasted in system information are selected from 8 values which are taken from the Rel-13 PUSCH tables.

Support NW enabling the use of TBS smaller than the maximum configured.

The agreements are similar for NB-IoT and LTE-M apart from the use of 'PUSCH' or 'NPUSCH'.

The following agreements apply for both LTE-M and NB-IoT:
- The use of TBS smaller than the maximum configured is configured per CE level in SIB.
- Per cell, in the below, $T_i < T_{i+1}$, eNB can configure that the UE chooses from:
  ➢ When there are 4 permitted actual transmitted TBS $\{T_1, T_2, T_3, T_4\}$
    ✧ $T_2$ or $T_4$
    ✧ $T_1$, or $T_2$, or $T_3$, or $T_4$
  ➢ When there are 3 permitted actual transmitted TBS $\{T_1, T_2, T_3\}$
    ✧ $T_2$ or $T_3$
    ✧ $T_1$ or $T_2$ or $T_3$
  ➢ When there are 2 permitted actual transmitted TBS $\{T_1, T_2\}$
    ✧ $T_1$ or $T_2$
- $T_i$ with the maximum value of i is the maximum TBS in SIB.

Up to 4 TBS values are defined based on only the maximum broadcast TBS

And specifically for LTE-M, agreements include:
- The 8 maximum TBS values in CE mode A (i.e. PRACH levels 0 and 1) are {328 408 504 600 712 808 936 1000}.
  ➢ Only values of $N_{PRB}$ and values of TBS in legacy Rel-13 PUSCH table can be used for EDT
- The 8 maximum TBS values in CE mode B (i.e. PRACH levels 2 and 3) are {328 408 456 504 600 712 808 936}.
  ➢ Only values of $N_{PRB}$ and values of TBS in legacy Rel-13 PUSCH table can be used for EDT
- For each of the 8 maximum TBS values
  ➢ The number of repetitions changes depending on the actual TBS, potentially including numbers of repetitions which are not included in legacy PUSCH repetition numbers (FFS how)

The possible smaller TBS values are predefined from the configured maximum TBS and the configured maximum number of blind decodes.

The 'R' bit in RAR may be used to differentiate EDT and non-EDT.

An example TBS table on EDT for CE mode A follows in Table 2:

TABLE 2

| Max TBS | 328 | 408 | 504 | 600 | 712 | 808 | 936 | 1000 |
|---|---|---|---|---|---|---|---|---|
| $T_1$ | 328 | 328 | 328 | 328 | 328 | 328 | 328 | 328 |
| $T_2$ |  | 408 | 408 | 408 | 456 | 504 | 504 | 536 |
| $T_3$ |  |  | 456 | 504 | 600 | 712 | 712 | 776 |
| $T_4$ |  |  | 504 | 600 | 712 | 808 | 936 | 1000 |

An example TBS table on EDT for CE mode B follows in Table 3:

TABLE 3

| Max TBS | 328 | 408 | 456 | 504 | 600 | 712 | 808 | 936 |
|---|---|---|---|---|---|---|---|---|
| $T_1$ | 328 | 328 | 328 | 328 | 328 | 328 | 328 | 328 |
| $T_2$ |  | 408 | 408 | 408 | 408 | 456 | 504 | 504 |
| $T_3$ |  |  | 456 | 456 | 504 | 600 | 712 | 712 |
| $T_4$ |  |  |  | 504 | 600 | 712 | 808 | 936 |

And specifically for NB-IoT in addition:
The 8 maximum TBS is {1000, 936, 808, 680, 584, 504, 408, 328}.

Table 4 is taken as baseline for up to 4 TBS values for each maximum broadcast TBS when the use of smaller TBS is enabled.

TABLE 4

|  | 328 | 408 | 504 | 584 | 680 | 808 | 936 | 1000 |
|---|---|---|---|---|---|---|---|---|
| $T_1$ | 328 | 328 | 328 | 328 | 328 | 328 | 328 | 328 |
| $T_2$ |  | 408 | 408 | 408 | 456 | 504 | 504 | 536 |
| $T_3$ |  |  | 504 | 504 | 584 | 680 | 712 | 776 |
| $T_4$ |  |  |  | 584 | 680 | 808 | 936 | 1000 |

There currently exist certain challenge(s). With EDT, the Msg3 payload is considerably larger. For NB-IoT, it can increase from 88 bits up to 1000 bits, which may create problems during contention resolution phase (i.e. Msg3 and Msg4 of the Random Access or Early Data Transmission procedure). For example, the UE selects the CE level for Random Access based on RSRP measurement, and the measurement error in the UE can be rather large (as much as +/−10 dB for low SNR), and this could cause the link adaptation and number of repetitions for EDT Msg3 transmission to be incorrect. Even if the selected CE level is reasonably correct, the UE can move to worse coverage before the transmission of Msg3, again leading to EDT problems.

SUMMARY

To address the foregoing problems with existing solutions, disclosed is systems and methods for early data transmission (EDT).

According to certain embodiments, a method by a wireless device includes obtaining, in a downlink control information (DCI) field, an indication of whether to perform a fallback to a radio resource control (RRC) connection setup or resume procedure or whether to abort a random access attempt. Based on the indication, wireless device determines to perform the fallback to the RRC connection setup or resume procedure or to abort the random access attempt.

According to certain embodiments, a wireless device includes processing circuitry for obtaining, in a DCI field, an indication of whether to perform a fallback to a RRC connection setup or resume procedure or whether to abort a random access attempt. Based on the indication, the processing circuitry determines to perform the fallback to the RRC connection setup or resume procedure or to abort the random access attempt.

According to certain embodiments, a method by a network node is provided that includes sending, in a DCI field, an indication to a wireless device. The indication indicates whether to perform a fallback to a RRC connection setup or resume procedure or whether to abort a random access attempt.

According to certain embodiments, a network node includes processing circuitry for sending, in a DCI field, an indication to a wireless device. The indication indicates whether to perform a fallback to a RRC connection setup or resume procedure or whether to abort a random access attempt.

Certain embodiments may provide one or more of the following technical advantage(s). For example, particular embodiments provide a power efficient mechanism that, when EDT goes wrong, limits the UE power consumption and system resource waste.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In legacy procedure (Rel-13 for LTE-M and NB-IoT), the user equipment (UE) selects the suitable coverage enhancement (CE) level based on measured RSRP and RSRP-thresholds signaling to the UE by eNB in system information broadcast (for NB-IoT, CE-levels are not explicitly mentioned but the principle is the same for different configured NPRACH resources with different numbers of repetitions). The UE transmits a preamble in Msg1 with the number of repetitions specified for that CE-level.

In response, the eNB provides an uplink grant including a number of repetitions for Msg3 transmission to the UE in RAR in Msg2 and can thereby perform some amount of link adaptation. The measurement error in the UE can, however, be very large, around +/−10 dB for low SNR, and this can lead to an incorrect CE-level selection for Msg1 transmission. Thus, the link adaptation for the entire Random Access (RA) procedure, and later Early Data Transmission (EDT) procedure, is may not be accurate.

Figure 1:
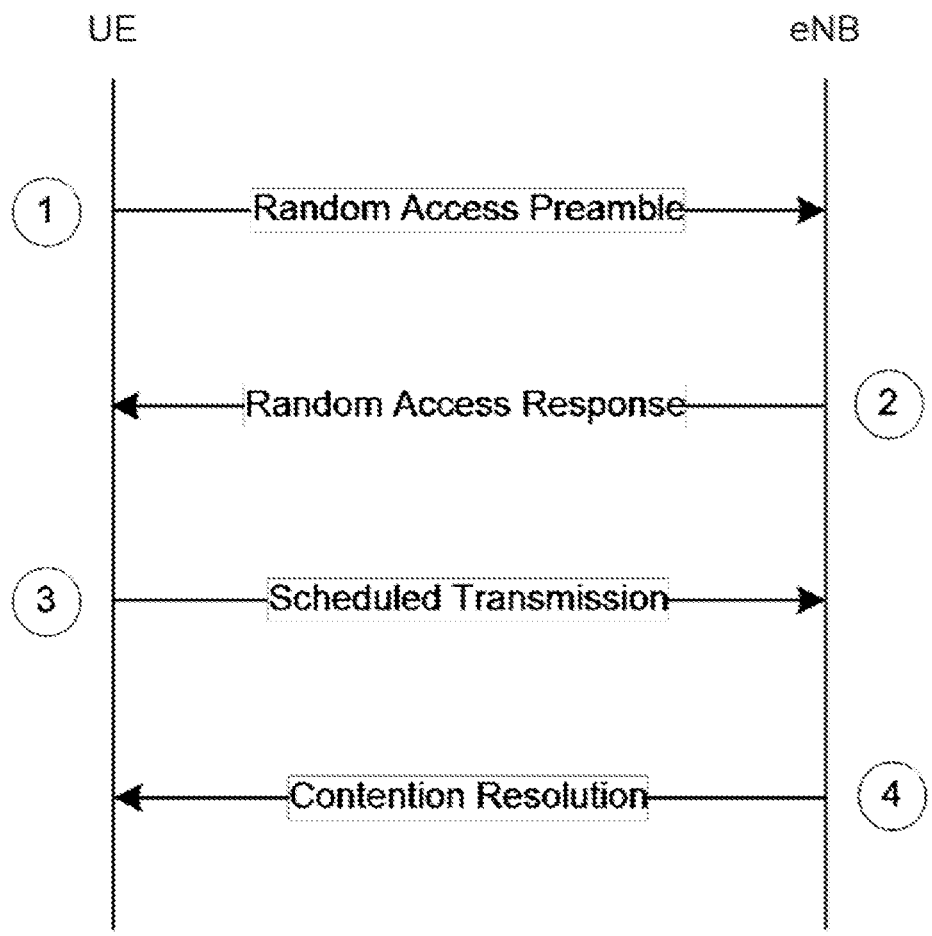
FIG. 1 illustrates the contention-based random access (RA) procedure from 3GPP TS36.300.
Figure 2:
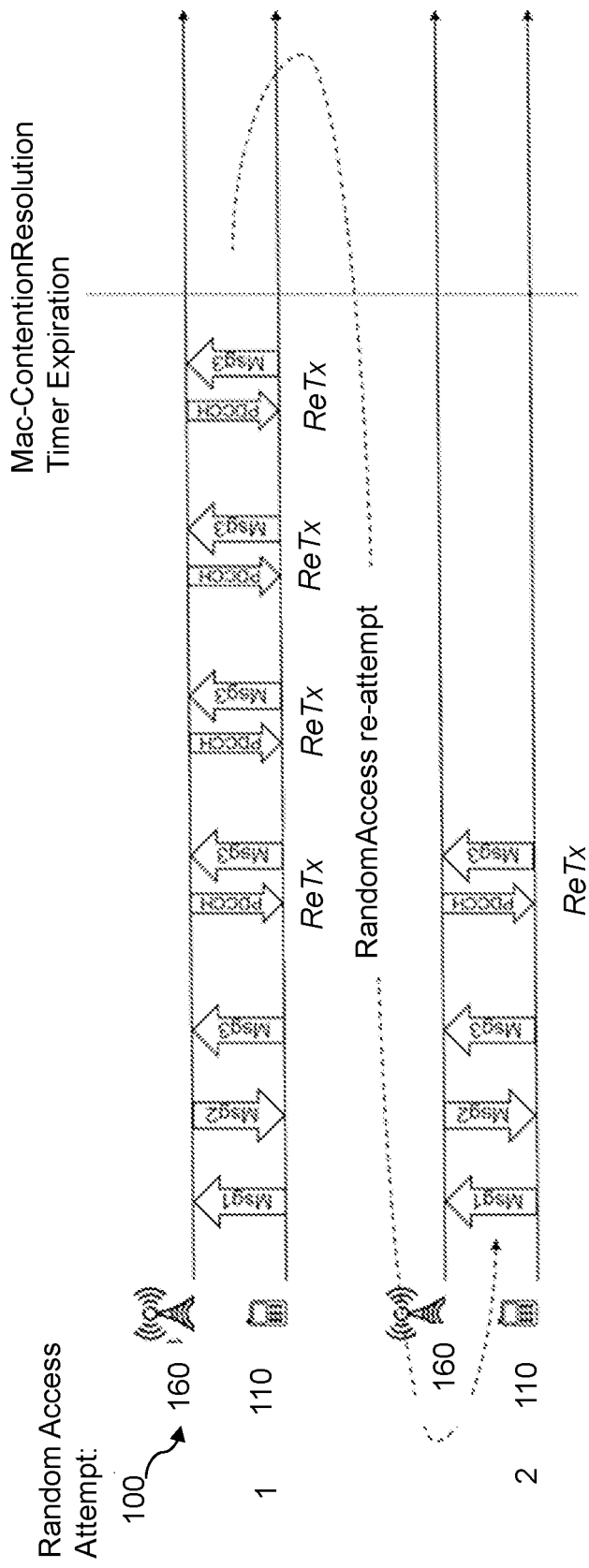
FIG. 2 illustrates the legacy Rel-13 random access re-attempt upon Msg3 failure.

If Msg3 transmission fails, eNB can dynamically schedule Msg3 retransmission using PDCCH (for eMTC/LTE-M MPDCCH is used, and for NB-IoT NPDCCH is used and both technologies support only adaptive non-synchronous HARQ in uplink). FIG. 2 illustrates the legacy Rel-13 random access re-attempt 100 upon Msg3 failure.

The UE continues retransmitting Msg3 according to grants received from eNB, and attempts to decode Msg4 until the MAC-ContentionResolutionTimer expires. At this point the UE concludes that the contention resolution and the RA procedure failed and will start over with a second RA attempt. Because HARQ and soft-combining is used for the Msg3 retransmissions, only retransmissions with the same TBS is specified.

If two UEs have selected the same preamble for Msg1 transmission in the same (N)PRACH resource, the start-over from with a new RA attempt will likely help because there is a random back-off time for the start and it is therefore unlikely that the same two UEs will collide again. However, if the problem is link adaptation and that the number of repetitions is not sufficient for successful reception of Msg3, the UE will continue with RA attempts in the current CE-level until a RA attempt counter, PREAMBLE_TRANSMISSION_COUNTER_CE, reaches a configured limit, maxNumPreambleAttemptCE, (configured in MAC) at which point the UE will ramp-up to the next higher CE-level and re-attempt RA there. If the initial CE-level is significantly incorrect, this procedure can require many transmissions and is costly both in terms of system resource consumption, latency and UE power consumption. (The procedure above is somewhat simplified, the UE will also ramp-up its output power based on the counter PREAMBLE_TRANSMISSION_COUNTER and limit preambleTransMax-CE, at least in the lower CE-levels).

Figure 3:
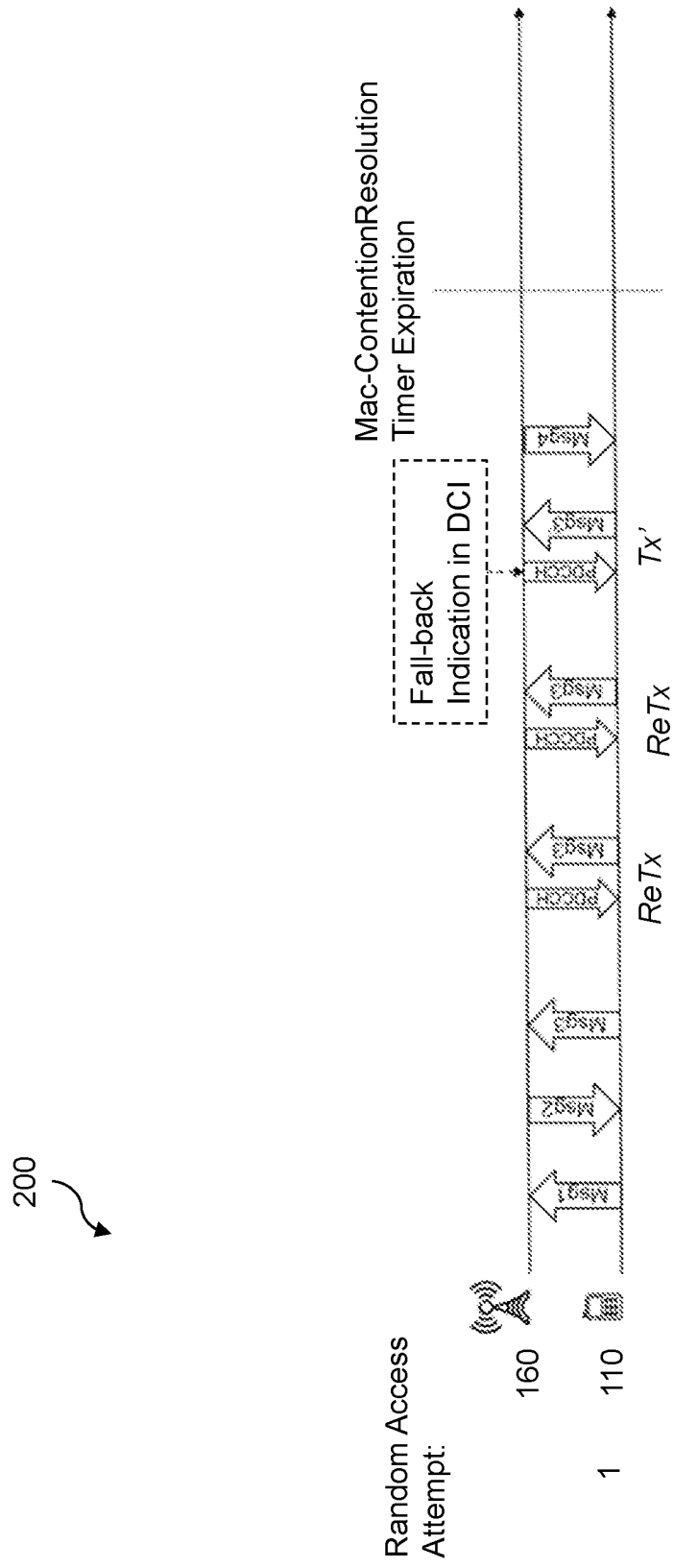
FIG. 3 illustrates Dynamic EDT Msg3 fall-back, according to certain embodiments.

Particular embodiments include fall back to a Release 13 RRC Connection Request. In a first group of embodiments, bits or values in the (M/N)PDCCH DCI which are not used for Msg3 re-transmission may be repurposed to indicate to the UE that it should fall-back to Rel-13 RRC Connection setup or RRC Resume procedure and re-build Msg3 for the subsequent transmission. FIG. 3 illustrates Dynamic EDT Msg3 fall-back 200, according to certain embodiments.

In particular embodiments, the indication is conveyed through the modulation and coding scheme (MCS) field in the DCI. As disclosed in 3GPP TS 36.212, DCI formats 6-0A/6-0B (for LTE-M) and N0 (for NB-IoT) have a 4-bit MCS field, which is sufficient for carrying all MCS values needed for fall-back to legacy Msg3 transmission as well as one or more values for indication of EDT Msg3 retransmission.

In some embodiments, the indication is conveyed through the new data indicator (NDI) field in the DCI. The NDI field is not needed when giving an UL grant for Msg3, so it can be repurposed to mean EDT retransmission when the NDI field is set to '0' and fall-back when the NDI field is set to '1', for example.

In some embodiments, other DCI fields are repurposed in similar ways as in the mentioned embodiments for the MCS and NDI fields.

In some embodiments, the eNB provides a smaller Transport Block Size (TBS) in the UL-grant, i.e. a legacy/Rel-13 format rather than the larger Rel-15 EDT format. The UE flushes the previous Msg3 buffer containing the RRCEarlyDataRequest message and the uplink data payload, and rebuilds a (smaller) Msg3 containing RRCConnectionRequest or RRCConnectionResumeRequest and no uplink data payload. Furthermore, the number of repetitions may be updated to further adjust the link adaption.

Figure 4:
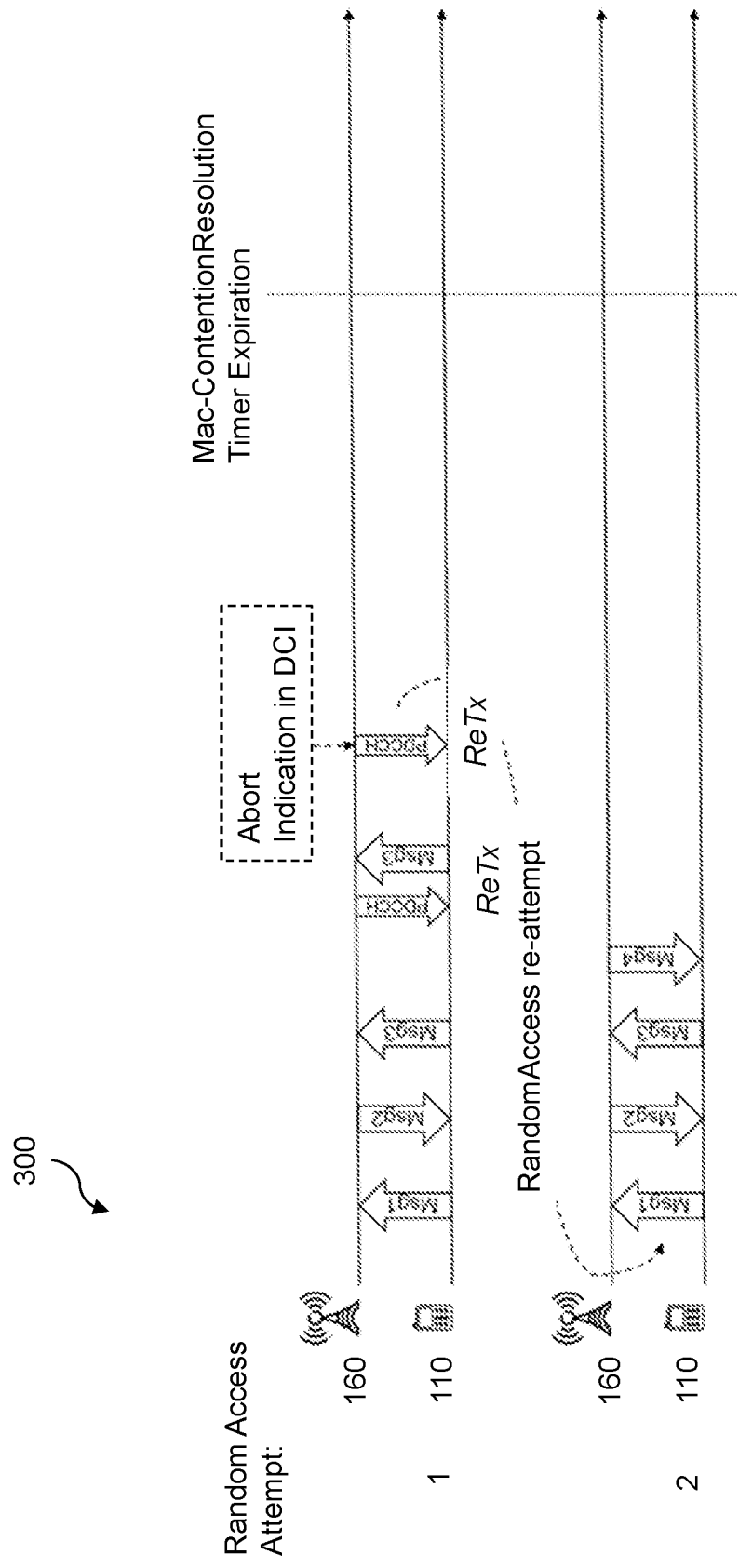
FIG. 4 illustrates an example dynamic EDT Msg3 abort, according to certain embodiments.

Particular embodiments include abortion of the procedure or an attempt within a procedure In a second group of embodiments, bits or values in the (M/N)PDCCH DCI which are not used for Msg3 re-transmission are again used as a dynamic indication, but in this case to abort the ongoing RA attempt without waiting for the contention resolution timer to expire. FIG. 4 illustrates an example dynamic EDT Msg3 abort 300, according to certain embodiments.

In particular embodiments, the indication is conveyed through the MCS field in the DCI. As described in TS 36.212, DCI formats 6-0A/6-0B (for LTE-M) and N0 (for NB-IoT) have a 4-bit MCS field, which is sufficient for one or more values for indication of abortion of the transmission as well as one or more values for indication of EDT Msg3 retransmission. Furthermore, note that the first and second main embodiments can be combined by letting some values mean 'fallback', one or more values mean 'abortion', and one or more values mean 'EDT Msg3 retransmission'.

In some embodiments, the indication is conveyed through the NDI field in the DCI. The NDI field is not needed when giving an UL grant for Msg3, so it can be repurposed to mean 'EDT retransmission' when the NDI field is set to '0' and 'abortion' when the NDI field is set to '1', for example.

In some embodiments, other DCI fields are repurposed in similar ways as in the mentioned embodiments for the MCS and NDI fields.

In particular embodiments, an indication may be included in DCI not to use EDT for subsequent attempt, i.e. a non-EDT preamble would be selected by the UE for the subsequent RA attempt. In some embodiments, this is always the case, i.e. implicit from the abort and using one bit or value in DCI, whereas in other embodiments an additional bit or value in DCI is used for this purpose.

In yet another embodiment, an indication may be included in DCI to instruct the UE to use a higher or lower CE-level for a subsequent RA attempt. An example using 2 bits is given in Table 5 below:

TABLE 5

| DCI bits: | CE-level change: |
|---|---|
| '00' | 0 |
| '01' | −1 |
| '10' | +1 |
| '11' | +2 |

Some embodiments include an EDT-specific maxNumPreambleAttemptCE. In a third group of embodiments, EDT specific maximum preamble transmission limitation may be used per CE-level. Because the larger EDT Msg3 will likely use a much higher number of repetitions than the smaller legacy/Rel-13 Msg3, ramping-up to and failing on the highest configured CE-level wastes significantly more system resources and UE power. Therefore, EDT specific (and typically lower) limits for maxNumPreambleAttemptCE may be used whenever the UE uses EDT procedure.

Particular embodiments may use an implicit (e.g., fixed in the standard) downscaling of maxNumPreambleAttemptCE for EDT, either the same for all EDT or proportional to the TBS. The downscaling factor may be (rather than being fixed in the standard) provided using the DCI bits or values in another embodiment.

Figure 5:
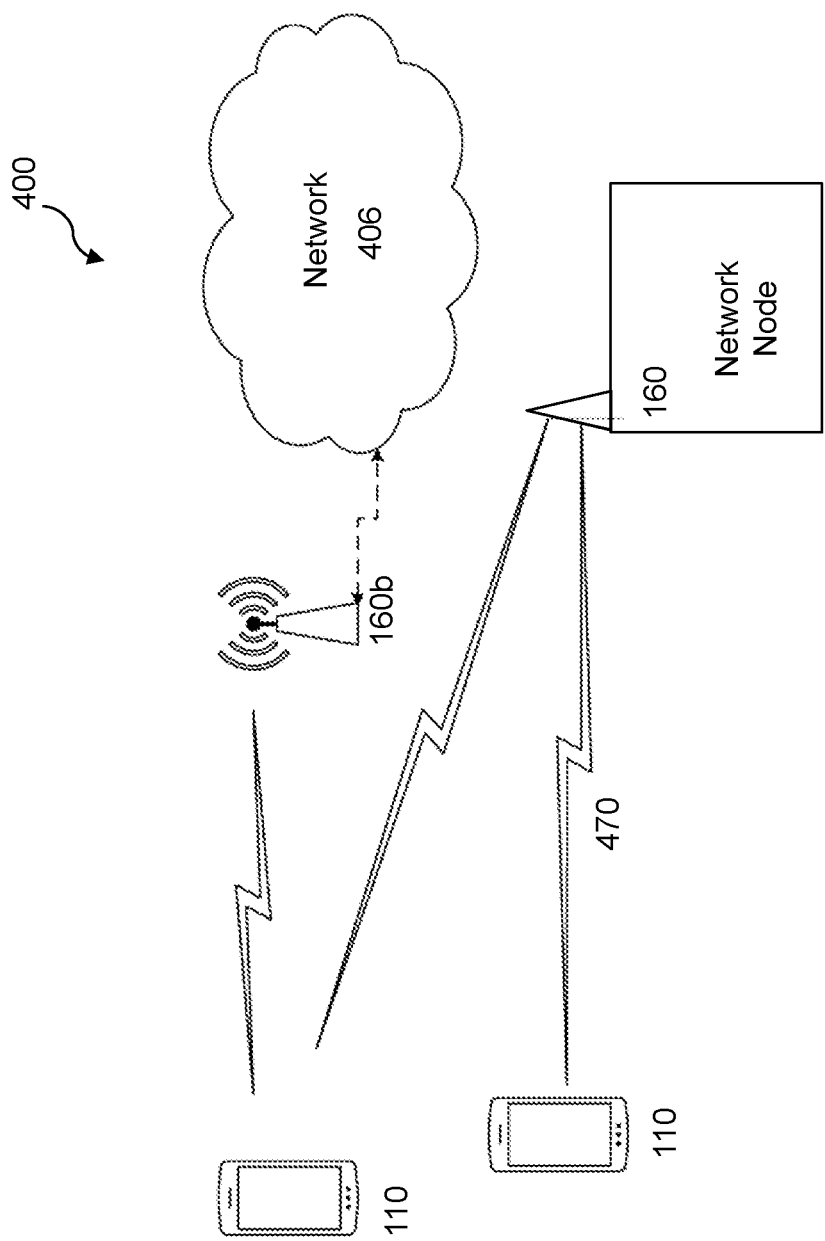
FIG. 5 illustrates an example wireless network for EDT, according to certain embodiments.

FIG. 5 illustrates an example wireless network in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 406, network nodes 460 and 460b, and WDs 410, 410b, and 410c. In practice, a wireless network may further include any additional elements suitable to support communication between wireless devices or between a wireless device and another communication device, such as a landline telephone, a service provider, or any other network node or end device. Of the illustrated components, network node 460 and wireless device (WD) 410 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 406 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 460 and WD 410 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
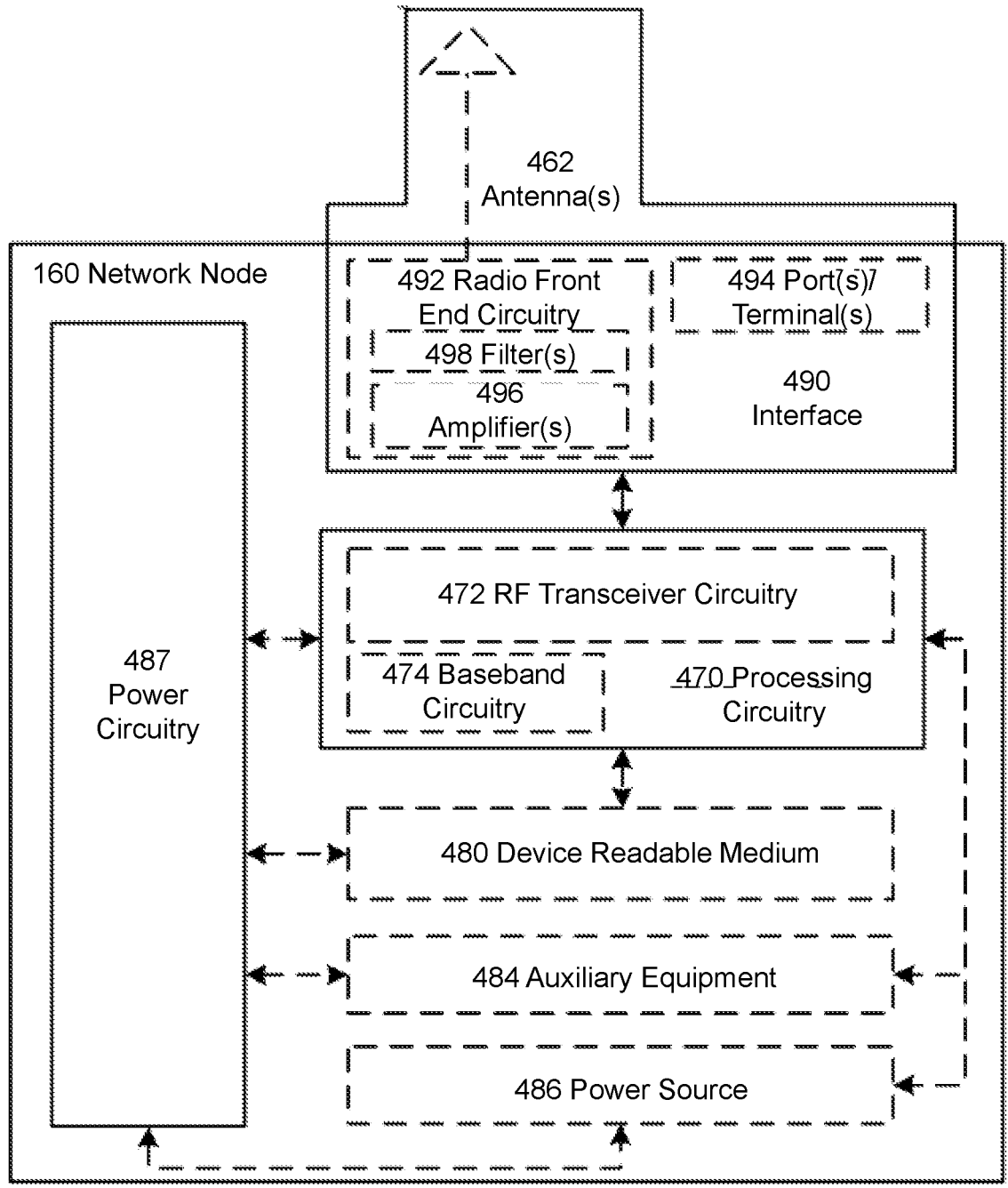
FIG. 6 illustrates an example network node for EDT, according to certain embodiments.

FIG. 6 illustrates an example network node 160, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 460 includes processing circuitry 470, device readable medium 480, interface 490, auxiliary equipment 484, power source 486, power circuitry 487, and antenna 462. Although network node 460 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 460 are depicted as single boxes located within a larger box, or nested within multiple boxes, in practice, a network node may comprise multiple different physical components that make up a single illustrated component (e.g., device readable medium 480 may comprise multiple separate hard drives as well as multiple RAM modules).

Similarly, network node 460 may be composed of multiple physically separate components (e.g., a NodeB component and a RNC component, or a BTS component and a BSC component, etc.), which may each have their own respective components. In certain scenarios in which network node 460 comprises multiple separate components (e.g., BTS and BSC components), one or more of the separate components may be shared among several network nodes. For example, a single RNC may control multiple NodeB's. In such a scenario, each unique NodeB and RNC pair may in some instances be considered a single separate network node. In some embodiments, network node 460 may be configured to support multiple radio access technologies (RATs). In such embodiments, some components may be duplicated (e.g., separate device readable medium 480 for the different RATs) and some components may be reused (e.g., the same antenna 462 may be shared by the RATs). Network node 460 may also include multiple sets of the various illustrated components for different wireless technologies integrated into network node 460, such as, for example, GSM, WCDMA, LTE, NR, WiFi, or Bluetooth wireless technologies. These wireless technologies may be integrated into the same or different chip or set of chips and other components within network node 460.

Processing circuitry 470 is configured to perform any determining, calculating, or similar operations (e.g., certain obtaining operations) described herein as being provided by a network node. These operations performed by processing circuitry 470 may include processing information obtained by processing circuitry 470 by, for example, converting the obtained information into other information, comparing the obtained information or converted information to information stored in the network node, and/or performing one or more operations based on the obtained information or converted information, and as a result of said processing making a determination.

Processing circuitry 470 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 460 components, such as device readable medium 480, network node 460 functionality. For example, processing circuitry 470 may execute instructions stored in device readable medium 480 or in memory within processing circuitry 470. Such functionality may include providing any of the various wireless features, functions, or benefits discussed herein. In some embodiments, processing circuitry 470 may include a system on a chip (SOC).

In some embodiments, processing circuitry 470 may include one or more of radio frequency (RF) transceiver circuitry 472 and baseband processing circuitry 474. In some embodiments, radio frequency (RF) transceiver circuitry 472 and baseband processing circuitry 474 may be on separate chips (or sets of chips), boards, or units, such as radio units and digital units. In alternative embodiments, part or all of RF transceiver circuitry 472 and baseband processing circuitry 474 may be on the same chip or set of chips, boards, or units.

In certain embodiments, some or all of the functionality described herein as being provided by a network node, base station, eNB or other such network device may be performed by processing circuitry 470 executing instructions stored on device readable medium 480 or memory within processing circuitry 470. In alternative embodiments, some or all of the functionality may be provided by processing circuitry 470 without executing instructions stored on a separate or discrete device readable medium, such as in a hard-wired manner. In any of those embodiments, whether executing instructions stored on a device readable storage medium or not, processing circuitry 470 can be configured to perform the described functionality. The benefits provided by such functionality are not limited to processing circuitry 470 alone or to other components of network node 460, but are enjoyed by network node 460 as a whole, and/or by end users and the wireless network generally.

Device readable medium 480 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 470. Device readable medium 480 may store any suitable instructions, data or information, including a computer program, software, an application including one or more of logic, rules, code, tables, etc. and/or other instructions capable of being executed by processing circuitry 470 and, utilized by network node 460. Device readable medium 480 may be used to store any calculations made by processing circuitry 470 and/or any data received via interface 490. In some embodiments, processing circuitry 470 and device readable medium 480 may be considered to be integrated.

Interface 490 is used in the wired or wireless communication of signalling and/or data between network node 460, network 406, and/or WDs 410. As illustrated, interface 490 comprises port(s)/terminal(s) 494 to send and receive data, for example to and from network 406 over a wired connection. Interface 490 also includes radio front end circuitry 492 that may be coupled to, or in certain embodiments a part of, antenna 462. Radio front end circuitry 492 comprises filters 498 and amplifiers 496. Radio front end circuitry 492 may be connected to antenna 462 and processing circuitry 470. Radio front end circuitry may be configured to condition signals communicated between antenna 462 and processing circuitry 470. Radio front end circuitry 492 may receive digital data that is to be sent out to other network nodes or WDs via a wireless connection. Radio front end circuitry 492 may convert the digital data into a radio signal having the appropriate channel and bandwidth parameters using a combination of filters 498 and/or amplifiers 496. The radio signal may then be transmitted via antenna 462. Similarly, when receiving data, antenna 462 may collect radio signals which are then converted into digital data by radio front end circuitry 492. The digital data may be passed to processing circuitry 470. In other embodiments, the interface may comprise different components and/or different combinations of components.

In certain alternative embodiments, network node 460 may not include separate radio front end circuitry 492, instead, processing circuitry 470 may comprise radio front end circuitry and may be connected to antenna 462 without separate radio front end circuitry 492. Similarly, in some embodiments, all or some of RF transceiver circuitry 472 may be considered a part of interface 490. In still other embodiments, interface 490 may include one or more ports or terminals 494, radio front end circuitry 492, and RF transceiver circuitry 472, as part of a radio unit (not shown), and interface 490 may communicate with baseband processing circuitry 474, which is part of a digital unit (not shown).

Antenna 462 may include one or more antennas, or antenna arrays, configured to send and/or receive wireless signals. Antenna 462 may be coupled to radio front end circuitry 490 and may be any type of antenna capable of transmitting and receiving data and/or signals wirelessly. In some embodiments, antenna 462 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 462 may be separate from network node 460 and may be connectable to network node 460 through an interface or port.

Antenna 462, interface 490, and/or processing circuitry 470 may be configured to perform any receiving operations and/or certain obtaining operations described herein as being performed by a network node. Any information, data and/or signals may be received from a wireless device, another network node and/or any other network equipment. Similarly, antenna 462, interface 490, and/or processing circuitry 470 may be configured to perform any transmitting operations described herein as being performed by a network node. Any information, data and/or signals may be transmitted to a wireless device, another network node and/or any other network equipment.

Power circuitry 487 may comprise, or be coupled to, power management circuitry and is configured to supply the components of network node 460 with power for performing the functionality described herein. Power circuitry 487 may receive power from power source 486. Power source 486 and/or power circuitry 487 may be configured to provide power to the various components of network node 460 in a form suitable for the respective components (e.g., at a voltage and current level needed for each respective component). Power source 486 may either be included in, or external to, power circuitry 487 and/or network node 460. For example, network node 460 may be connectable to an external power source (e.g., an electricity outlet) via an input circuitry or interface such as an electrical cable, whereby the external power source supplies power to power circuitry 487. As a further example, power source 486 may comprise a source of power in the form of a battery or battery pack which is connected to, or integrated in, power circuitry 487. The battery may provide backup power should the external power source fail. Other types of power sources, such as photovoltaic devices, may also be used.

Alternative embodiments of network node 460 may include additional components beyond those shown in FIG. 6 that may be responsible for providing certain aspects of the network node's functionality, including any of the functionality described herein and/or any functionality necessary to support the subject matter described herein. For example, network node 460 may include user interface equipment to allow input of information into network node 460 and to allow output of information from network node 460. This may allow a user to perform diagnostic, maintenance, repair, and other administrative functions for network node 460.

Figure 7:
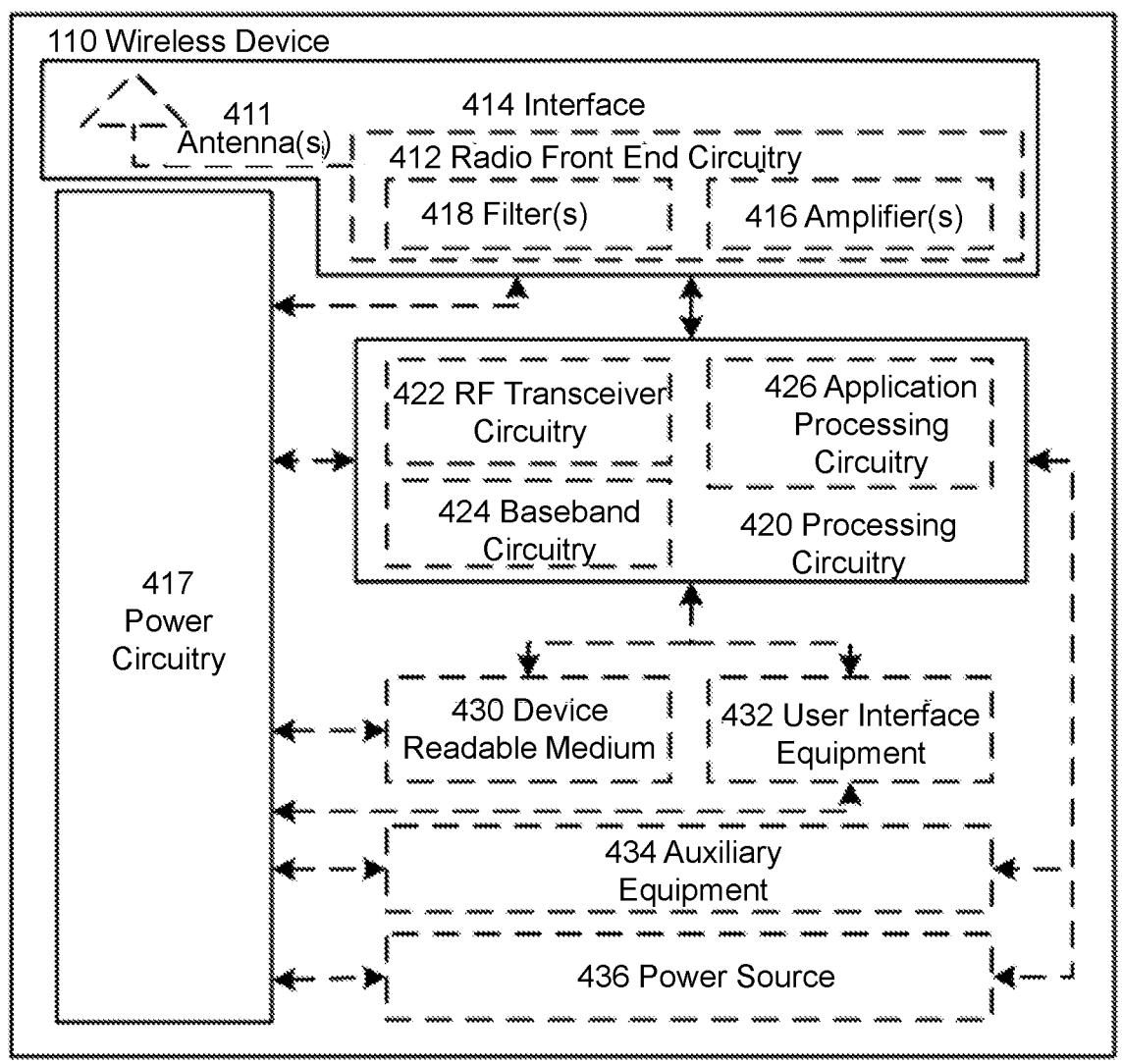
FIG. 7 illustrates an example wireless device for EDT, according to certain embodiments.

FIG. 7 illustrates an example WD 110, according to certain embodiments. As used herein, WD 110 refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 410 includes antenna 411, interface 414, processing circuitry 420, device readable medium 430, user interface equipment 432, auxiliary equipment 434, power source 436 and power circuitry 437. WD 410 may include multiple sets of one or more of the illustrated components for different wireless technologies supported by WD 410, such as, for example, GSM, WCDMA, LTE, NR, WiFi, WiMAX, or Bluetooth wireless technologies, just to mention a few. These wireless technologies may be integrated into the same or different chips or set of chips as other components within WD 410.

Antenna 411 may include one or more antennas or antenna arrays, configured to send and/or receive wireless signals, and is connected to interface 414. In certain alternative embodiments, antenna 411 may be separate from WD 410 and be connectable to WD 410 through an interface or port. Antenna 411, interface 414, and/or processing circuitry 420 may be configured to perform any receiving or transmitting operations described herein as being performed by a WD. Any information, data and/or signals may be received from a network node and/or another WD. In some embodiments, radio front end circuitry and/or antenna 411 may be considered an interface.

As illustrated in FIG. 7, interface 414 comprises radio front end circuitry 412 and antenna 411. Radio front end circuitry 412 comprise one or more filters 418 and amplifiers 416. Radio front end circuitry 414 is connected to antenna 411 and processing circuitry 420, and is configured to condition signals communicated between antenna 411 and processing circuitry 420. Radio front end circuitry 412 may be coupled to or a part of antenna 411. In some embodiments, WD 410 may not include separate radio front end circuitry 412; rather, processing circuitry 420 may comprise radio front end circuitry and may be connected to antenna 411. Similarly, in some embodiments, some or all of RF transceiver circuitry 422 may be considered a part of interface 414. Radio front end circuitry 412 may receive digital data that is to be sent out to other network nodes or WDs via a wireless connection. Radio front end circuitry 412 may convert the digital data into a radio signal having the appropriate channel and bandwidth parameters using a combination of filters 418 and/or amplifiers 416. The radio signal may then be transmitted via antenna 411. Similarly, when receiving data, antenna 411 may collect radio signals which are then converted into digital data by radio front end circuitry 412. The digital data may be passed to processing circuitry 420. In other embodiments, the interface may comprise different components and/or different combinations of components.

Processing circuitry 420 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 410 components, such as device readable medium 430, WD 410 functionality. Such functionality may include providing any of the various wireless features or benefits discussed herein. For example, processing circuitry 420 may execute instructions stored in device readable medium 430 or in memory within processing circuitry 420 to provide the functionality disclosed herein.

As illustrated in FIG. 7, processing circuitry 420 includes one or more of RF transceiver circuitry 422, baseband processing circuitry 424, and application processing circuitry 426. In other embodiments, the processing circuitry may comprise different components and/or different combinations of components. In certain embodiments processing circuitry 420 of WD 410 may comprise a SOC. In some embodiments, RF transceiver circuitry 422, baseband processing circuitry 424, and application processing circuitry 426 may be on separate chips or sets of chips. In alternative embodiments, part or all of baseband processing circuitry 424 and application processing circuitry 426 may be combined into one chip or set of chips, and RF transceiver circuitry 422 may be on a separate chip or set of chips. In still alternative embodiments, part or all of RF transceiver circuitry 422 and baseband processing circuitry 424 may be on the same chip or set of chips, and application processing circuitry 426 may be on a separate chip or set of chips. In yet other alternative embodiments, part or all of RF transceiver circuitry 422, baseband processing circuitry 424, and application processing circuitry 426 may be combined in the same chip or set of chips. In some embodiments, RF transceiver circuitry 422 may be a part of interface 414. RF transceiver circuitry 422 may condition RF signals for processing circuitry 420.

In certain embodiments, some or all of the functionality described herein as being performed by a WD may be provided by processing circuitry 420 executing instructions stored on device readable medium 430, which in certain embodiments may be a computer-readable storage medium. In alternative embodiments, some or all of the functionality may be provided by processing circuitry 420 without executing instructions stored on a separate or discrete device readable storage medium, such as in a hard-wired manner. In any of those particular embodiments, whether executing instructions stored on a device readable storage medium or not, processing circuitry 420 can be configured to perform the described functionality. The benefits provided by such functionality are not limited to processing circuitry 420 alone or to other components of WD 410, but are enjoyed by WD 410 as a whole, and/or by end users and the wireless network generally.

Processing circuitry 420 may be configured to perform any determining, calculating, or similar operations (e.g., certain obtaining operations) described herein as being performed by a WD. These operations, as performed by processing circuitry 420, may include processing information obtained by processing circuitry 420 by, for example, converting the obtained information into other information, comparing the obtained information or converted information to information stored by WD 410, and/or performing one or more operations based on the obtained information or converted information, and as a result of said processing making a determination.

Device readable medium 430 may be operable to store a computer program, software, an application including one or more of logic, rules, code, tables, etc. and/or other instructions capable of being executed by processing circuitry 420. Device readable medium 430 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 420. In some embodiments, processing circuitry 420 and device readable medium 430 may be considered to be integrated.

User interface equipment 432 may provide components that allow for a human user to interact with WD 410. Such interaction may be of many forms, such as visual, audial, tactile, etc. User interface equipment 432 may be operable to produce output to the user and to allow the user to provide input to WD 410. The type of interaction may vary depending on the type of user interface equipment 432 installed in WD 410. For example, if WD 410 is a smart phone, the interaction may be via a touch screen; if WD 410 is a smart meter, the interaction may be through a screen that provides usage (e.g., the number of gallons used) or a speaker that provides an audible alert (e.g., if smoke is detected). User interface equipment 432 may include input interfaces, devices and circuits, and output interfaces, devices and circuits. User interface equipment 432 is configured to allow input of information into WD 410, and is connected to processing circuitry 420 to allow processing circuitry 420 to process the input information. User interface equipment 432 may include, for example, a microphone, a proximity or other sensor, keys/buttons, a touch display, one or more cameras, a USB port, or other input circuitry. User interface equipment 432 is also configured to allow output of information from WD 410, and to allow processing circuitry 420 to output information from WD 410. User interface equipment 432 may include, for example, a speaker, a display, vibrating circuitry, a USB port, a headphone interface, or other output circuitry. Using one or more input and output interfaces, devices, and circuits, of user interface equipment 432, WD 410 may communicate with end users and/or the wireless network, and allow them to benefit from the functionality described herein.

Auxiliary equipment 434 is operable to provide more specific functionality which may not be generally performed by WDs. This may comprise specialized sensors for doing measurements for various purposes, interfaces for additional types of communication such as wired communications etc. The inclusion and type of components of auxiliary equipment 434 may vary depending on the embodiment and/or scenario.

Power source 436 may, in some embodiments, be in the form of a battery or battery pack. Other types of power sources, such as an external power source (e.g., an electricity outlet), photovoltaic devices or power cells, may also be used. WD 410 may further comprise power circuitry 437 for delivering power from power source 436 to the various parts of WD 410 which need power from power source 436 to carry out any functionality described or indicated herein. Power circuitry 437 may in certain embodiments comprise power management circuitry. Power circuitry 437 may additionally or alternatively be operable to receive power from an external power source; in which case WD 410 may be connectable to the external power source (such as an electricity outlet) via input circuitry or an interface such as an electrical power cable. Power circuitry 437 may also in certain embodiments be operable to deliver power from an external power source to power source 436. This may be, for example, for the charging of power source 436. Power circuitry 437 may perform any formatting, converting, or other modification to the power from power source 436 to make the power suitable for the respective components of WD 410 to which power is supplied.

Figure 8:
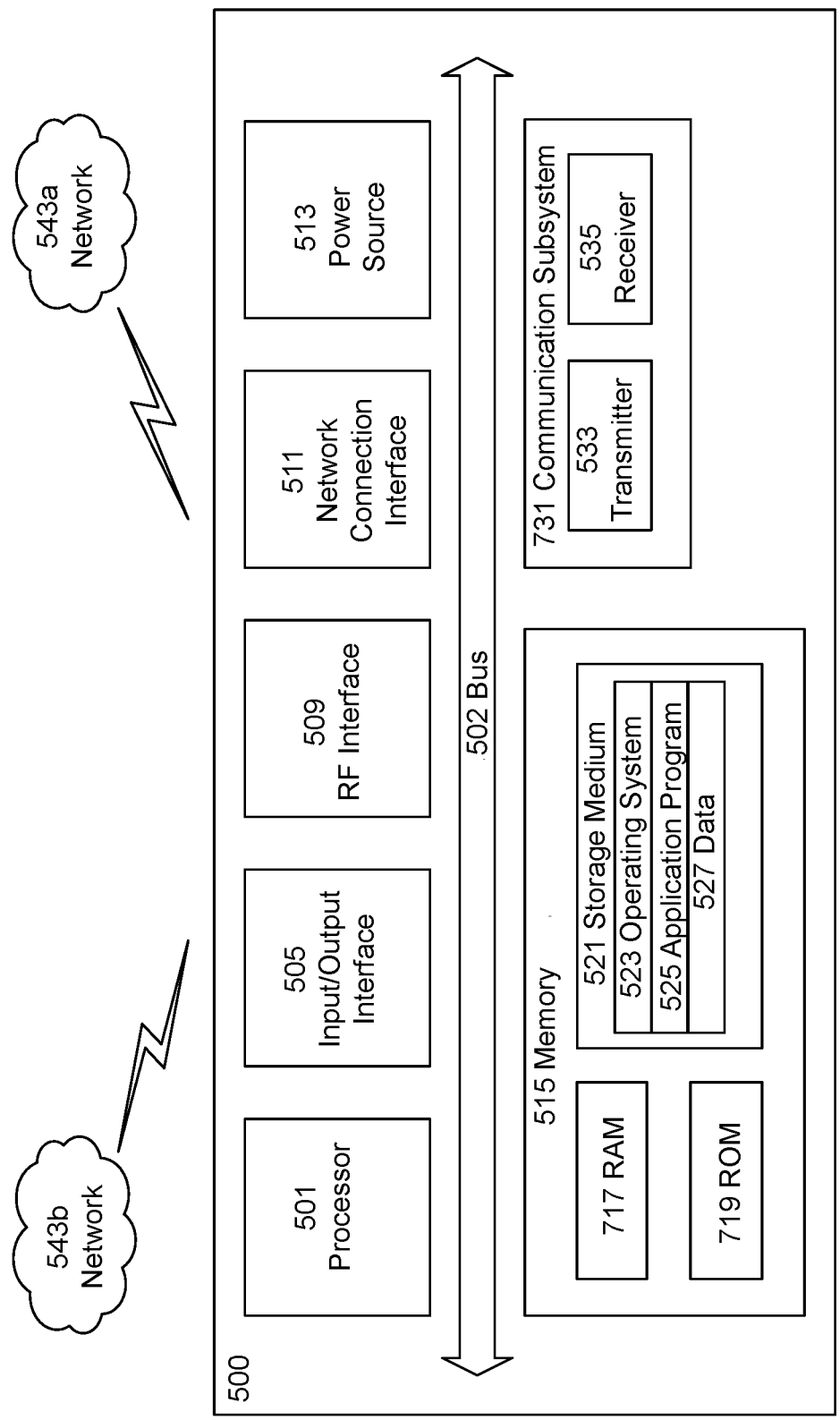
FIG. 8 illustrate an example user equipment for EDT, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 5200 may be any UE identified by the 3$^{rd}$ Generation Partnership Project (3GPP), including a NB-IoT UE, a machine type communication (MTC) UE, and/or an enhanced MTC (eMTC) UE. UE 500, as illustrated in FIG. 8, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 8 is a UE, the components discussed herein are equally applicable to a WD, and vice-versa.

In FIG. 8, UE 500 includes processing circuitry 501 that is operatively coupled to input/output interface 505, radio frequency (RF) interface 509, network connection interface 511, memory 515 including random access memory (RAM) 517, read-only memory (ROM) 519, and storage medium 521 or the like, communication subsystem 531, power source 533, and/or any other component, or any combination thereof. Storage medium 521 includes operating system 523, application program 525, and data 527. In other embodiments, storage medium 521 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 501 may be configured to process computer instructions and data. Processing circuitry 501 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 501 may include two central processing units (CPUs). Data may be information in a form suitable for use by a computer.

In the depicted embodiment, input/output interface 505 may be configured to provide a communication interface to an input device, output device, or input and output device. UE 500 may be configured to use an output device via input/output interface 505. An output device may use the same type of interface port as an input device. For example, a USB port may be used to provide input to and output from UE 500. The output device may be a speaker, a sound card, a video card, a display, a monitor, a printer, an actuator, an emitter, a smartcard, another output device, or any combination thereof. UE 500 may be configured to use an input device via input/output interface 505 to allow a user to capture information into UE 500. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 509 may be configured to provide a communication interface to RF components such as a transmitter, a receiver, and an antenna. Network connection interface 511 may be configured to provide a communication interface to network 543a. Network 543a may encompass wired and/or wireless networks such as a local-area network (LAN), a wide-area network (WAN), a computer network, a wireless network, a telecommunications network, another like network or any combination thereof. For example, network 543a may comprise a Wi-Fi network. Network connection interface 511 may be configured to include a receiver and a transmitter interface used to communicate with one or more other devices over a communication network according to one or more communication protocols, such as Ethernet, TCP/IP, SONET, ATM, or the like. Network connection interface 511 may implement receiver and transmitter functionality appropriate to the communication network links (e.g., optical, electrical, and the like). The transmitter and receiver functions may share circuit components, software or firmware, or alternatively may be implemented separately.

RAM 517 may be configured to interface via bus 502 to processing circuitry 501 to provide storage or caching of data or computer instructions during the execution of software programs such as the operating system, application programs, and device drivers. ROM 519 may be configured to provide computer instructions or data to processing circuitry 501. For example, ROM 519 may be configured to store invariant low-level system code or data for basic system functions such as basic input and output (I/O), startup, or reception of keystrokes from a keyboard that are stored in a non-volatile memory. Storage medium 521 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 521 may be configured to include operating system 523, application program 525 such as a web browser application, a widget or gadget engine or another application, and data file 527. Storage medium 521 may store, for use by UE 500, any of a variety of various operating systems or combinations of operating systems.

Storage medium 521 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 521 may allow UE 500 to access computer-executable instructions, application programs or the like, stored on transitory or non-transitory memory media, to off-load data, or to upload data. An article of manufacture, such as one utilizing a communication system may be tangibly embodied in storage medium 521, which may comprise a device readable medium.

In FIG. 8, processing circuitry 501 may be configured to communicate with network 543b using communication subsystem 531. Network 543a and network 543b may be the same network or networks or different network or networks. Communication subsystem 531 may be configured to include one or more transceivers used to communicate with network 543b. For example, communication subsystem 531 may be configured to include one or more transceivers used to communicate with one or more remote transceivers of another device capable of wireless communication such as another WD, UE, or base station of a radio access network (RAN) according to one or more communication protocols, such as IEEE 802.5, CDMA, WCDMA, GSM, LTE, UTRAN, WiMax, or the like. Each transceiver may include transmitter 533 and/or receiver 535 to implement transmitter or receiver functionality, respectively, appropriate to the RAN links (e.g., frequency allocations and the like). Further, transmitter 533 and receiver 535 of each transceiver may share circuit components, software or firmware, or alternatively may be implemented separately.

In the illustrated embodiment, the communication functions of communication subsystem 531 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 531 may include cellular communication, Wi-Fi communication, Bluetooth communication, and GPS communication. Network 543b may encompass wired and/or wireless networks such as a local-area network (LAN), a wide-area network (WAN), a computer network, a wireless network, a telecommunications network, another like network or any combination thereof. For example, network 543b may be a cellular network, a Wi-Fi network, and/or a near-field network. Power source 513 may be configured to provide alternating current (AC) or direct current (DC) power to components of UE 500.

The features, benefits and/or functions described herein may be implemented in one of the components of UE 500 or partitioned across multiple components of UE 500. Further, the features, benefits, and/or functions described herein may be implemented in any combination of hardware, software or firmware. In one example, communication subsystem 531 may be configured to include any of the components described herein. Further, processing circuitry 501 may be configured to communicate with any of such components over bus 502. In another example, any of such components may be represented by program instructions stored in memory that when executed by processing circuitry 501 perform the corresponding functions described herein. In another example, the functionality of any of such components may be partitioned between processing circuitry 501 and communication subsystem 531. In another example, the non-computationally intensive functions of any of such components may be implemented in software or firmware and the computationally intensive functions may be implemented in hardware.

Figure 9:
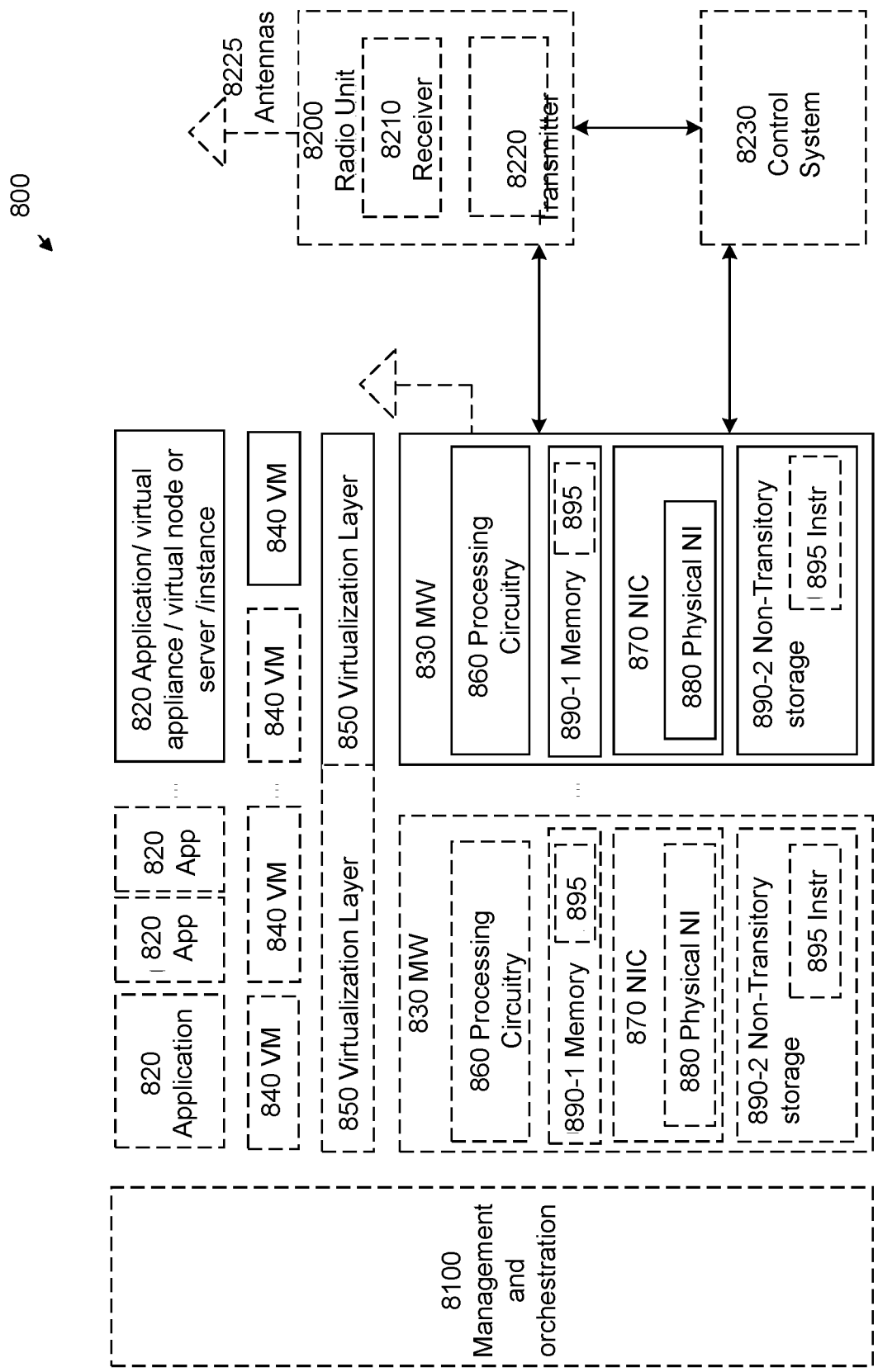
FIG. 9 illustrates a virtualization environment in which functions implemented by some embodiments may be virtualized, according to certain embodiments.

FIG. 9 is a schematic block diagram illustrating a virtualization environment 800 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 800 hosted by one or more of hardware nodes 830. Further, in embodiments in which the virtual node is not a radio access node or does not require radio connectivity (e.g., a core network node), then the network node may be entirely virtualized.

The functions may be implemented by one or more applications 820 (which may alternatively be called software instances, virtual appliances, network functions, virtual nodes, virtual network functions, etc.) operative to implement some of the features, functions, and/or benefits of some of the embodiments disclosed herein. Applications 820 are run in virtualization environment 800 which provides hardware 830 comprising processing circuitry 860 and memory 890. Memory 890 contains instructions 895 executable by processing circuitry 860 whereby application 820 is operative to provide one or more of the features, benefits, and/or functions disclosed herein.

Virtualization environment 800, comprises general-purpose or special-purpose network hardware devices 830 comprising a set of one or more processors or processing circuitry 860, which may be commercial off-the-shelf (COTS) processors, dedicated Application Specific Integrated Circuits (ASICs), or any other type of processing circuitry including digital or analog hardware components or special purpose processors. Each hardware device may comprise memory 890-1 which may be non-persistent memory for temporarily storing instructions 895 or software executed by processing circuitry 860. Each hardware device may comprise one or more network interface controllers (NICs) 870, also known as network interface cards, which include physical network interface 880. Each hardware device may also include non-transitory, persistent, machine-readable storage media 890-2 having stored therein software 895 and/or instructions executable by processing circuitry 860. Software 895 may include any type of software including software for instantiating one or more virtualization layers 850 (also referred to as hypervisors), software to execute virtual machines 840 as well as software allowing it to execute functions, features and/or benefits described in relation with some embodiments described herein.

Virtual machines 840, comprise virtual processing, virtual memory, virtual networking or interface and virtual storage, and may be run by a corresponding virtualization layer 850 or hypervisor. Different embodiments of the instance of virtual appliance 820 may be implemented on one or more of virtual machines 840, and the implementations may be made in different ways.

During operation, processing circuitry 860 executes software 895 to instantiate the hypervisor or virtualization layer 850, which may sometimes be referred to as a virtual machine monitor (VMM). Virtualization layer 850 may present a virtual operating platform that appears like networking hardware to virtual machine 840.

As shown in FIG. 8, hardware 830 may be a standalone network node with generic or specific components. Hardware 830 may comprise antenna 8225 and may implement some functions via virtualization. Alternatively, hardware 830 may be part of a larger cluster of hardware (e.g. such as in a data center or customer premise equipment (CPE)) where many hardware nodes work together and are managed via management and orchestration (MANO) 8100, which, among others, oversees lifecycle management of applications 820.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 840 may be a software implementation of a physical machine that runs programs as if they were executing on a physical, non-virtualized machine. Each of virtual machines 840, and that part of hardware 830 that executes that virtual machine, be it hardware dedicated to that virtual machine and/or hardware shared by that virtual machine with others of the virtual machines 840, forms a separate virtual network elements (VNE).

Still in the context of NFV, Virtual Network Function (VNF) is responsible for handling specific network functions that run in one or more virtual machines 840 on top of hardware networking infrastructure 830 and corresponds to application 820 in FIG. 8.

In some embodiments, one or more radio units 8200 that each include one or more transmitters 8220 and one or more receivers 8210 may be coupled to one or more antennas 8225. Radio units 8200 may communicate directly with hardware nodes 830 via one or more appropriate network interfaces and may be used in combination with the virtual components to provide a virtual node with radio capabilities, such as a radio access node or a base station.

In some embodiments, some signalling can be effected with the use of control system 8230 which may alternatively be used for communication between the hardware nodes 830 and radio units 8200.

Figure 10:
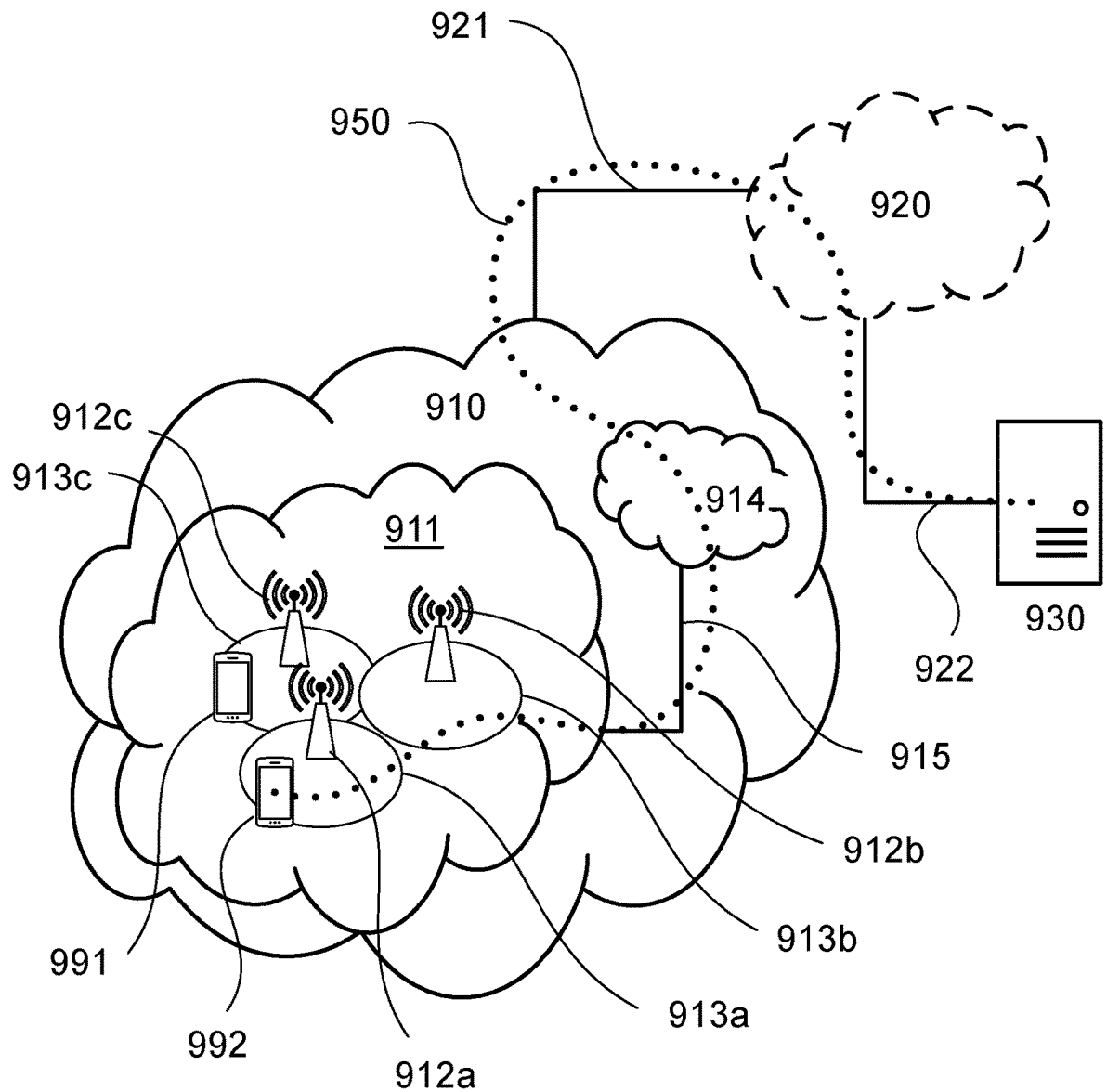
FIG. 10 illustrates a telecommunication network connected via an intermediate network to a host computer, according to certain embodiments.

FIG. 10 illustrates a telecommunication network connected via an intermediate network to a host computer in accordance with some embodiments.

With reference to FIG. 9, in accordance with an embodiment, a communication system includes telecommunication network 910, such as a 3GPP-type cellular network, which comprises access network 911, such as a radio access network, and core network 914. Access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to core network 914 over a wired or wireless connection 915. A first UE 991 located in coverage area 913c is configured to wirelessly connect to, or be paged by, the corresponding base station 912c. A second UE 992 in coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

Telecommunication network 910 is itself connected to host computer 930, which may be embodied in the hardware and/or software of a standalone server, a cloud-implemented server, a distributed server or as processing resources in a server farm. Host computer 930 may be under the ownership or control of a service provider, or may be operated by the service provider or on behalf of the service provider. Connections 921 and 922 between telecommunication network 910 and host computer 930 may extend directly from core network 914 to host computer 930 or may go via an optional intermediate network 920. Intermediate network 920 may be one of, or a combination of more than one of, a public, private or hosted network; intermediate network 920, if any, may be a backbone network or the Internet; in particular, intermediate network 920 may comprise two or more sub-networks (not shown).

The communication system of FIG. 9 as a whole enables connectivity between the connected UEs 991, 992 and host computer 930. The connectivity may be described as an over-the-top (OTT) connection 950. Host computer 930 and the connected UEs 991, 992 are configured to communicate data and/or signaling via OTT connection 950, using access network 911, core network 914, any intermediate network 920 and possible further infrastructure (not shown) as intermediaries. OTT connection 950 may be transparent in the sense that the participating communication devices through which OTT connection 950 passes are unaware of routing of uplink and downlink communications. For example, base station 912 may not or need not be informed about the past routing of an incoming downlink communication with data originating from host computer 930 to be forwarded (e.g., handed over) to a connected UE 991. Similarly, base station 912 need not be aware of the future routing of an outgoing uplink communication originating from the UE 991 towards the host computer 930.

Figure 11:
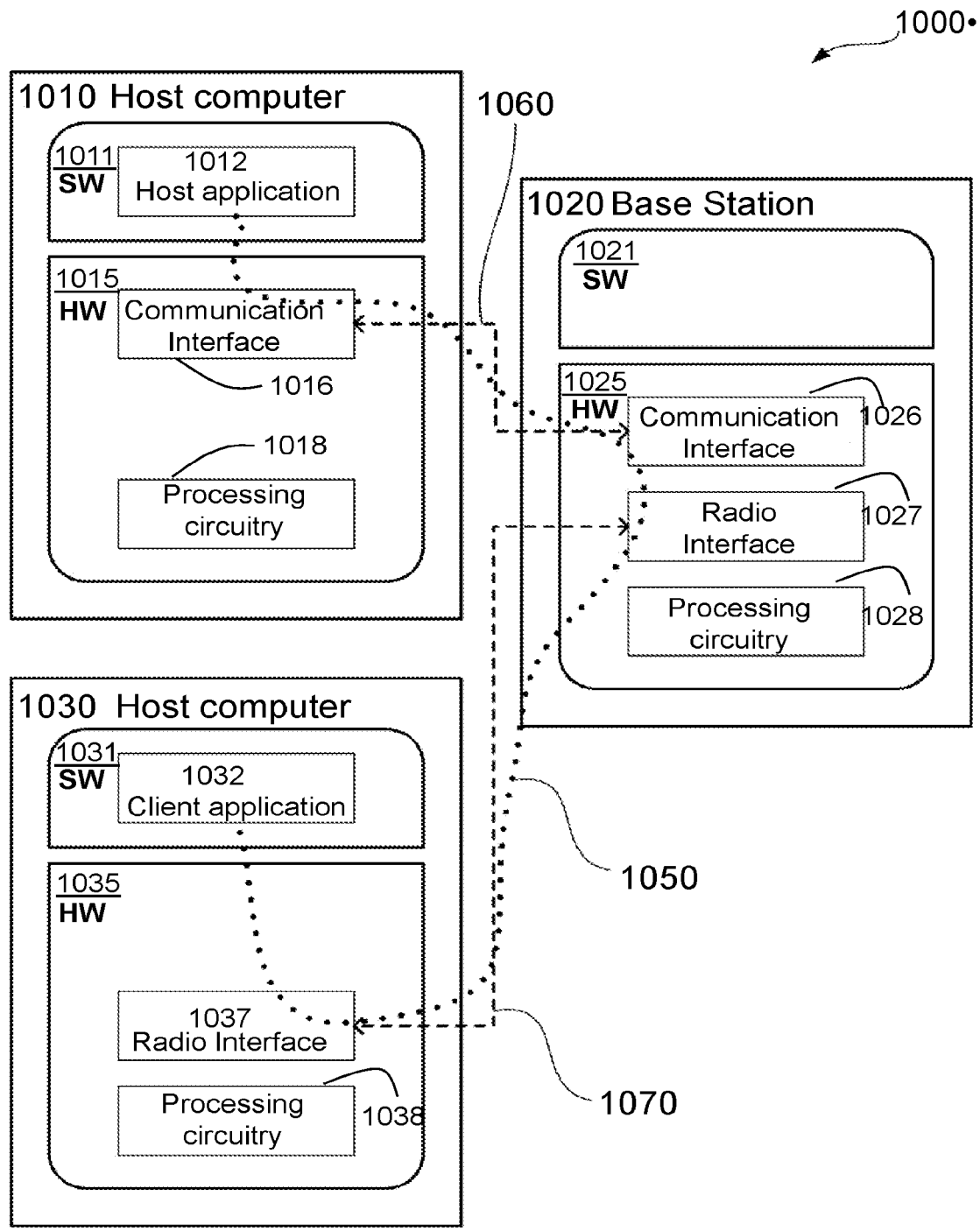
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 10. In communication system 1000, host computer 1010 comprises hardware 1015 including communication interface 1016 configured to set up and maintain a wired or wireless connection with an interface of a different communication device of communication system 1000. Host computer 1010 further comprises processing circuitry 1018, which may have storage and/or processing capabilities. In particular, processing circuitry 1018 may comprise one or more programmable processors, application-specific integrated circuits, field programmable gate arrays or combinations of these (not shown) adapted to execute instructions. Host computer 1010 further comprises software 1011, which is stored in or accessible by host computer 1010 and executable by processing circuitry 1018. Software 1011 includes host application 1012. Host application 1012 may be operable to provide a service to a remote user, such as UE 1030 connecting via OTT connection 1050 terminating at UE 1030 and host computer 1010. In providing the service to the remote user, host application 1012 may provide user data which is transmitted using OTT connection 1050.

Communication system 1000 further includes base station 1020 provided in a telecommunication system and comprising hardware 1025 enabling it to communicate with host computer 1010 and with UE 1030. Hardware 1025 may include communication interface 1026 for setting up and maintaining a wired or wireless connection with an interface of a different communication device of communication system 1000, as well as radio interface 1027 for setting up and maintaining at least wireless connection 1070 with UE 1030 located in a coverage area (not shown in FIG. 10) served by base station 1020. Communication interface 1026 may be configured to facilitate connection 1060 to host computer 1010. Connection 1060 may be direct or it may pass through a core network (not shown in FIG. 10) of the telecommunication system and/or through one or more intermediate networks outside the telecommunication system. In the embodiment shown, hardware 1025 of base station 1020 further includes processing circuitry 1028, which may comprise one or more programmable processors, application-specific integrated circuits, field programmable gate arrays or combinations of these (not shown) adapted to execute instructions. Base station 1020 further has software 1021 stored internally or accessible via an external connection.

Communication system 1000 further includes UE 1030 already referred to. Its hardware 1035 may include radio interface 1037 configured to set up and maintain wireless connection 1070 with a base station serving a coverage area in which UE 1030 is currently located. Hardware 1035 of UE 1030 further includes processing circuitry 1038, which may comprise one or more programmable processors, application-specific integrated circuits, field programmable gate arrays or combinations of these (not shown) adapted to execute instructions. UE 1030 further comprises software 1031, which is stored in or accessible by UE 1030 and executable by processing circuitry 1038. Software 1031 includes client application 1032. Client application 1032 may be operable to provide a service to a human or non-human user via UE 1030, with the support of host computer 1010. In host computer 1010, an executing host application 1012 may communicate with the executing client application 1032 via OTT connection 1050 terminating at UE 1030 and host computer 1010. In providing the service to the user, client application 1032 may receive request data from host application 1012 and provide user data in response to the request data. OTT connection 1050 may transfer both the request data and the user data. Client application 1032 may interact with the user to generate the user data that it provides.

It is noted that host computer 1010, base station 1020 and UE 1030 illustrated in FIG. 10 may be similar or identical to host computer 930, one of base stations 912a, 912b, 912c and one of UEs 991, 992 of FIG. 9, respectively. This is to say, the inner workings of these entities may be as shown in FIG. 10 and independently, the surrounding network topology may be that of FIG. 9.

In FIG. 10, OTT connection 1050 has been drawn abstractly to illustrate the communication between host computer 1010 and UE 1030 via base station 1020, without explicit reference to any intermediary devices and the precise routing of messages via these devices. Network infrastructure may determine the routing, which it may be configured to hide from UE 1030 or from the service provider operating host computer 1010, or both. While OTT connection 1050 is active, the network infrastructure may further take decisions by which it dynamically changes the routing (e.g., on the basis of load balancing consideration or reconfiguration of the network).

Wireless connection 1070 between UE 1030 and base station 1020 is in accordance with the teachings of the embodiments described throughout this disclosure. One or more of the various embodiments improve the performance of OTT services provided to UE 1030 using OTT connection 1050, in which wireless connection 1070 forms the last segment. More precisely, the teachings of these embodiments may improve the data rate and/or latency and thereby provide benefits such as reduced user waiting time and better responsiveness.

A measurement procedure may be provided for the purpose of monitoring data rate, latency and other factors on which the one or more embodiments improve. There may further be an optional network functionality for reconfiguring OTT connection 1050 between host computer 1010 and UE 1030, in response to variations in the measurement results. The measurement procedure and/or the network functionality for reconfiguring OTT connection 1050 may be implemented in software 1011 and hardware 1015 of host computer 1010 or in software 1031 and hardware 1035 of UE 1030, or both. In embodiments, sensors (not shown) may be deployed in or in association with communication devices through which OTT connection 1050 passes; the sensors may participate in the measurement procedure by supplying values of the monitored quantities exemplified above, or supplying values of other physical quantities from which software 1011, 1031 may compute or estimate the monitored quantities. The reconfiguring of OTT connection 1050 may include message format, retransmission settings, preferred routing etc.; the reconfiguring need not affect base station 1020, and it may be unknown or imperceptible to base station 1020. Such procedures and functionalities may be known and practiced in the art. In certain embodiments, measurements may involve proprietary UE signaling facilitating host computer 1010's measurements of throughput, propagation times, latency and the like. The measurements may be implemented in that software 1011 and 1031 causes messages to be transmitted, in particular empty or 'dummy' messages, using OTT connection 1050 while it monitors propagation times, errors etc.

Figures 12, 13:
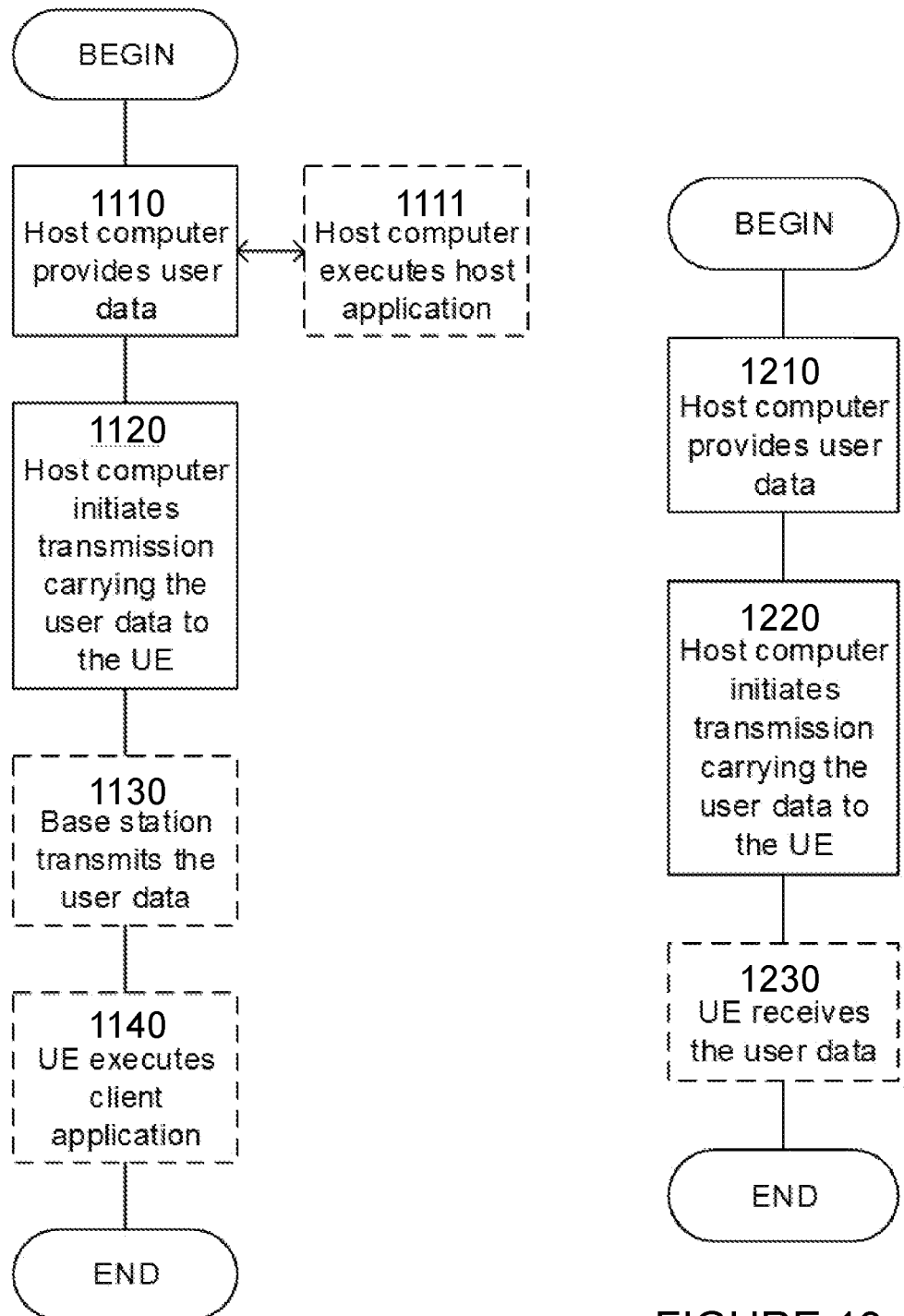
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figures 14, 15:
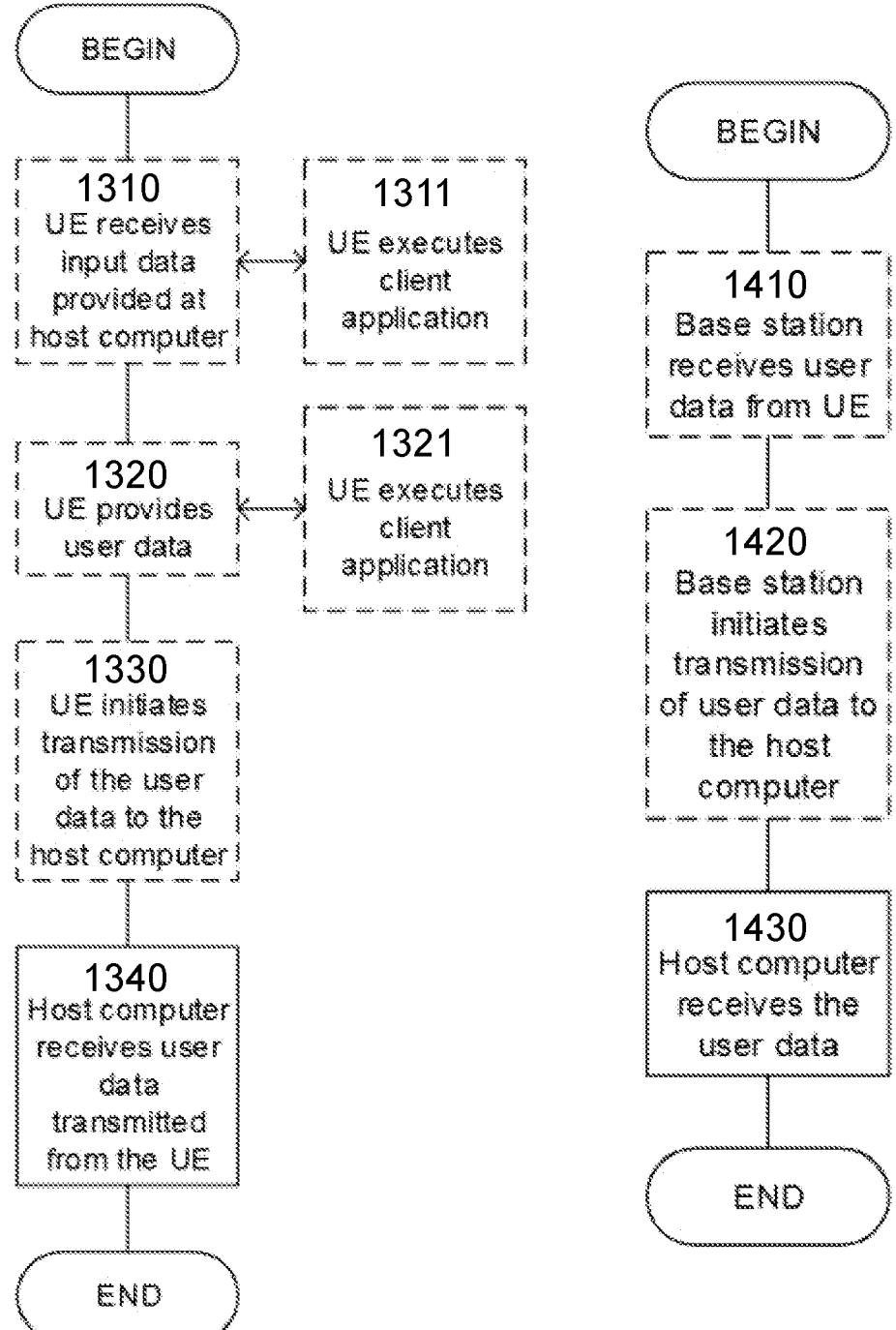
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional)

of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

Figure 16:
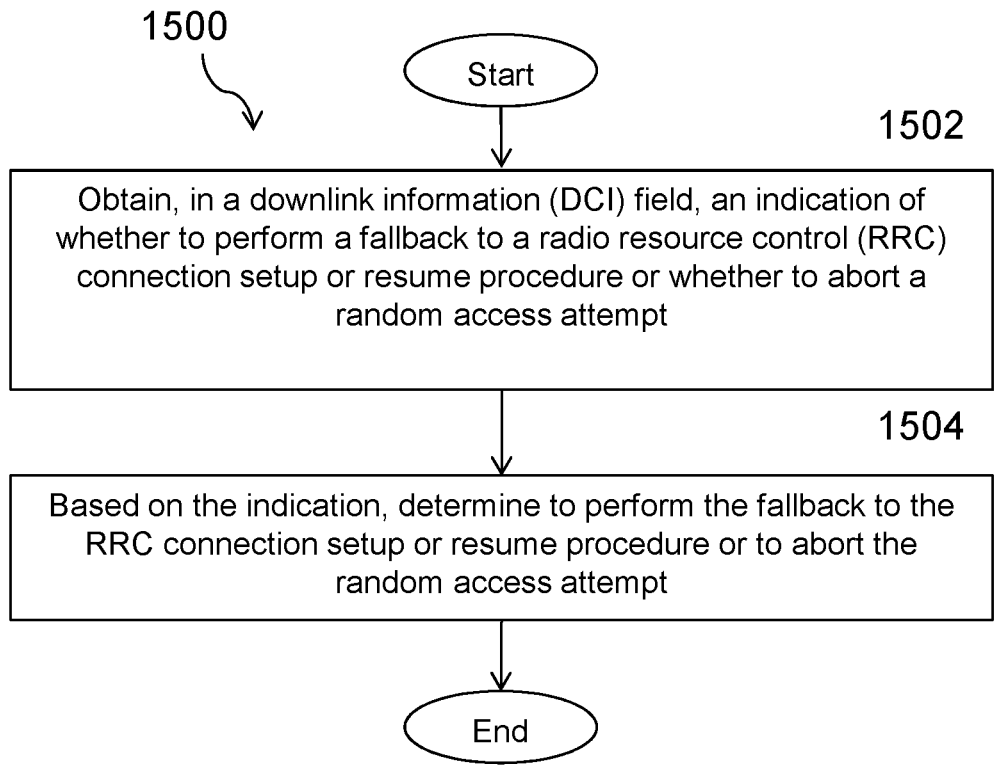
FIG. 16 illustrates an example method by a wireless device for EDT, according to certain embodiments.

FIG. 16 illustrates a method performed by a wireless device for EDT, according to certain embodiments. The method begins at step 1502 when wireless device 110 obtains, in a downlink control information, DCI, field, an indication of whether to perform a fallback to a RRC connection setup or resume procedure or whether to abort a random access attempt. Based on the indication, wireless device 110 determines to perform the fallback to the RRC connection setup or resume procedure or to abort the random access attempt, at step 1504.

In a particular embodiment, the DCI field comprises a modulation and coding scheme, MCS, field of the DCI.

In a particular embodiment, the DCI field comprises a new data indicator, NDI, field of the DCI.

In a particular embodiment, wireless device 110 determines to perform the fallback to the RRC connection setup or resume procedure and the method further comprises transmitting at least one of a RRCConnectionRequest or an RRCConnectionResume.

In a particular embodiment, wireless device 110 receives an uplink grant comprising a reduced TBS and transmits the at least one of the RRCConnectionRequest or the RRCConnectionResume based on the reduced TBS.

In a particular embodiment, wireless device 110 flushes a Msg3 buffer containing data associated with the EDT and transmits the RRCConnectionRequest or the RRCConnectionResume without the data associated with the EDT.

In a particular embodiment, wireless device 110 determines to abort the random access attempt before a contention resolution timer expires.

In a particular embodiment, wireless device 110 initiates a new random access attempt after aborting the random access attempt.

In a particular embodiment, wireless device 110 selects a non-EDT preamble for the new random access attempt.

In a particular embodiment, the new random access attempt comprises an initiation of a new random access procedure.

In a particular embodiment, wireless device 110 adjusts a coverage enhancement level of the wireless device for performing the fallback to the RRC connection setup or resume procedure or for initiating a new random access attempt after aborting the random access attempt.

In a particular embodiment, wireless device 110 determines a random access Msg3 failure. The determination to perform the fallback to the RRC connection setup or resume procedure or to abort the random access attempt may be performed in response to determining the random access Msg3 failure.

Figure 17:
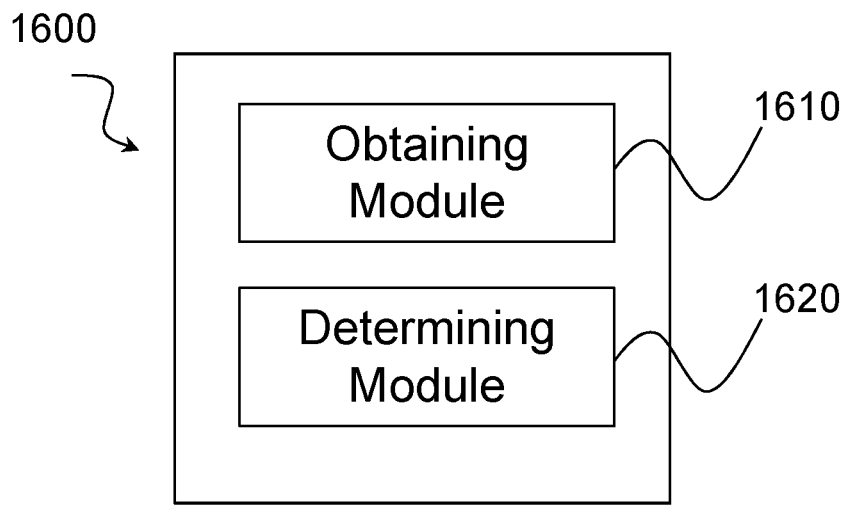
FIG. 17 illustrates an exemplary virtual computing device for EDT, according to certain embodiments.

In certain embodiments, the method for EDT as described above may be performed by a computer networking virtual apparatus. FIG. 17 illustrates an example virtual computing device 1600 for EDT, according to certain embodiments. In certain embodiments, virtual computing device 1600 may include modules for performing steps similar to those described above with regard to the method illustrated and described in FIG. 16. For example, virtual computing device 1600 may include an obtaining module 1602, a determining module 1604, and any other suitable modules for EDT. In some embodiments, one or more of the modules may be implemented by processing circuitry 420 of FIG. 7. In certain embodiments, the functions of two or more of the various modules may be combined into a single module.

The obtaining module 1602 may perform the obtaining functions of virtual computing device 1600. For example, in a particular embodiment, obtaining module 1602 may obtain, in a downlink control information, DCI, field, an indication of whether to perform a fallback to a RRC connection setup or resume procedure or whether to abort a random access attempt.

The determining module 1604 may perform the determining functions of virtual computing device 1600. For example, in a particular embodiment, determining module 1604 may determine to perform the fallback to the RRC connection setup or resume procedure or to abort the random access attempt based on the indication.

Other embodiments of virtual computing device 1600 may include additional components beyond those shown in FIG. 17 that may be responsible for providing certain aspects of the wireless device's functionality, including any of the functionality described above and/or any additional functionality (including any functionality necessary to support the solutions described above). The various different types of wireless devices 110 may include components having the same physical hardware but configured (e.g., via programming) to support different radio access technologies, or may represent partly or entirely different physical components.

Figure 18:
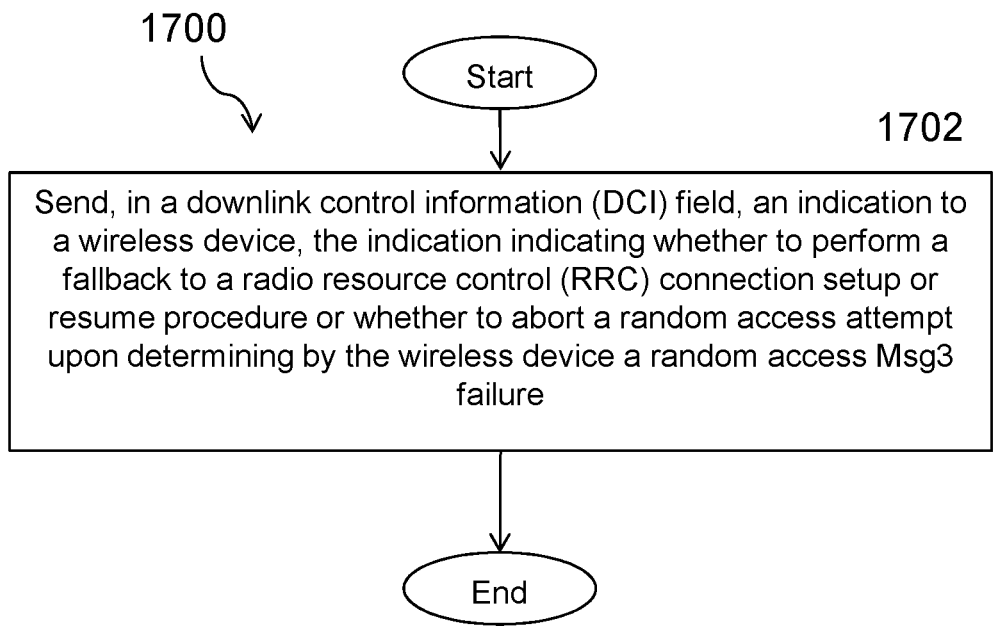
FIG. 18 illustrates an example method by a network node for EDT, according to certain embodiments.

FIG. 18 illustrates a method performed by a network node 160 for EDT, according to certain embodiments. The method begins when network node 160 sends, in a downlink control information, DCI, field, an indication to a wireless device. The indication indicates whether to perform a fallback to a radio resource control, RRC, connection setup or resume procedure or whether to abort a random access attempt.

In a particular embodiment, the DCI field comprises a MCS field or an NDI of the DCI.

In a particular embodiment, network node 160 receives, from the wireless device 110, at least one of a RRCConnectionRequest or an RRCConnectionResume.

In a particular embodiment, network node 160 transmits, to the wireless device 110, an uplink grant comprising a reduced TBS, and the at least one of the RRCConnectionRequest or the RRCConnectionResume is received based on the reduced TBS.

In a particular embodiment, network node 160 receives, from the wireless device 110, the RRCConnectionRequest or the RRCConnectionResume without the data associated with the EDT.

In a particular embodiment, network node 160 receives a message initiating a new random access attempt. In a further particular embodiment, the new random access attempt comprises an initiation of a new random access procedure.

Figure 19:
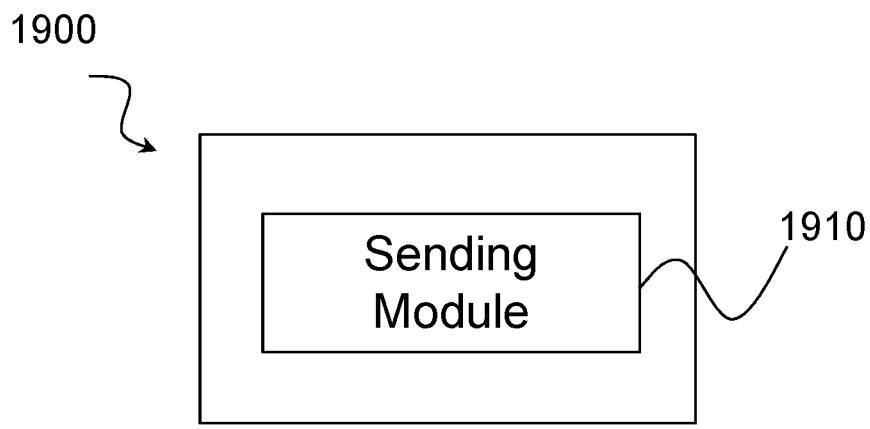
FIG. 19 illustrates an exemplary virtual computing device for EDT, according to certain embodiments.

In certain embodiments, the method for EDT as described above may be performed by a computer networking virtual apparatus. FIG. 19 illustrates an example virtual computing device 1900 for EDT, according to certain embodiments. In certain embodiments, virtual computing device 1900 may include modules for performing steps similar to those described above with regard to the method illustrated and described in FIG. 18. For example, virtual computing device 1900 may include a sending module 1902 and any other suitable modules for EDT. In some embodiments, one or more of the modules may be implemented by processing circuitry 470 of FIG. 6. In certain embodiments, the functions of two or more of the various modules may be combined into a single module.

The sending module 1902 may perform the sending functions of virtual computing device 1900. For example, in a particular embodiment, sending module 1902 may send, in a DCI field, an indication to a wireless device. The indication indicates whether to perform a fallback to a radio resource control, RRC, connection setup or resume procedure or whether to abort a random access attempt.

Other embodiments of virtual computing device 1900 may include additional components beyond those shown in FIG. 19 that may be responsible for providing certain aspects of the network node's functionality, including any of the functionality described above and/or any additional functionality (including any functionality necessary to support the solutions described above). The various different types of network nodes 160 may include components having the same physical hardware but configured (e.g., via programming) to support different radio access technologies, or may represent partly or entirely different physical components.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Example Group A Embodiments

Embodiment 1. A method performed by a wireless device for early data transmission, the method comprising:
  determining a random access Msg3 failure; and
  determining to fallback to a RRC connection setup or resume procedure or to abort the random access procedure.

Embodiment 2. The method of Embodiment 1 further comprising the step of obtaining an indication of whether to perform a fallback or abort procedure upon determining the random access Msg3 failure.

Embodiment 3. The method of Embodiment 2 wherein the indication comprises a downlink control information (DCI) field.

Embodiment 4. The method of Embodiment 3 wherein the indication comprises a MCS field of the DCI.

Embodiment 5. The method of Embodiment 3 wherein the indication comprises a NDI field of the DCI.

Embodiment 6. The method of any of the previous embodiments, further comprising:
  providing user data; and
  forwarding the user data to a host computer via the transmission to the base station.

Example Group B Embodiments

Embodiment 7. A method performed by a base station for early data transmission, the method comprising:
  sending an indication to a wireless device indicating whether to perform a fallback or abort procedure upon determining a random access Msg3 failure.

Embodiment 8. The method of any of the previous embodiments, further comprising:
  obtaining user data; and
  forwarding the user data to a host computer or a wireless device.

Group C Embodiments

Embodiment 9. A wireless device for early data transmission, the wireless device comprising:
  processing circuitry configured to perform any of the steps of any of the Group A embodiments; and
  power supply circuitry configured to supply power to the wireless device.

Embodiment 10. A base station for early data transmission, the base station comprising:
  processing circuitry configured to perform any of the steps of any of the Group B embodiments;
  power supply circuitry configured to supply power to the wireless device.

Embodiment 11. A user equipment (UE) for early data transmission, the UE comprising:
  an antenna configured to send and receive wireless signals;
  radio front-end circuitry connected to the antenna and to processing circuitry, and configured to condition signals communicated between the antenna and the processing circuitry;
  the processing circuitry being configured to perform any of the steps of any of the Group A embodiments;

an input interface connected to the processing circuitry and configured to allow input of information into the UE to be processed by the processing circuitry;

an output interface connected to the processing circuitry and configured to output information from the UE that has been processed by the processing circuitry; and a battery connected to the processing circuitry and configured to supply power to the UE.

Embodiment 12. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform any of the steps of any of the Group B embodiments.

Embodiment 13. The communication system of the pervious embodiment further including the base station.

Embodiment 14. The communication system of the previous 2 embodiments, further including the UE, wherein the UE is configured to communicate with the base station.

Embodiment 15. The communication system of the previous 3 embodiments, wherein:

the processing circuitry of the host computer is configured to execute a host application, thereby providing the user data; and the UE comprises processing circuitry configured to execute a client application associated with the host application.

Embodiment 16. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs any of the steps of any of the Group B embodiments.

Embodiment 17. The method of the previous embodiment, further comprising, at the base station, transmitting the user data.

Embodiment 18. The method of the previous 2 embodiments, wherein the user data is provided at the host computer by executing a host application, the method further comprising, at the UE, executing a client application associated with the host application.

Embodiment 19. A user equipment (UE) configured to communicate with a base station, the UE comprising a radio interface and processing circuitry configured to performs any of the previous 3 embodiments.

Embodiment 20. A communication system including a host computer comprising:

processing circuitry configured to provide user data; and a communication interface configured to forward user data to a cellular network for transmission to a user equipment (UE), wherein the UE comprises a radio interface and processing circuitry, the UE's components configured to perform any of the steps of any of the Group A embodiments.

Embodiment 21. The communication system of the previous embodiment, wherein the cellular network further includes a base station configured to communicate with the UE.

Embodiment 22. The communication system of the previous 2 embodiments, wherein:

the processing circuitry of the host computer is configured to execute a host application, thereby providing the user data; and the UE's processing circuitry is configured to execute a client application associated with the host application.

Embodiment 23. A method implemented in a communication system including a host computer, a base station and a user equipment (UE), the method comprising:

at the host computer, providing user data; and at the host computer, initiating a transmission carrying the user data to the UE via a cellular network comprising the base station, wherein the UE performs any of the steps of any of the Group A embodiments.

Embodiment 24. The method of the previous embodiment, further comprising at the UE, receiving the user data from the base station.

Embodiment 25. A communication system including a host computer comprising:

communication interface configured to receive user data originating from a transmission from a user equipment (UE) to a base station, wherein the UE comprises a radio interface and processing circuitry, the UE's processing circuitry configured to perform any of the steps of any of the Group A embodiments.

Embodiment 26. The communication system of the previous embodiment, further including the UE.

Embodiment 27. The communication system of the previous 2 embodiments, further including the base station, wherein the base station comprises a radio interface configured to communicate with the UE and a communication interface configured to forward to the host computer the user data carried by a transmission from the UE to the base station.

Embodiment 28. The communication system of the previous 3 embodiments, wherein:

the processing circuitry of the host computer is configured to execute a host application; and the UE's processing circuitry is configured to execute a client application associated with the host application, thereby providing the user data.

Embodiment 29. The communication system of the previous 4 embodiments, wherein:

the processing circuitry of the host computer is configured to execute a host application, thereby providing request data; and the UE's processing circuitry is configured to execute a client application associated with the host application, thereby providing the user data in response to the request data.

Embodiment 30. A method implemented in a communication system including a host computer, a base station and a user equipment (UE), the method comprising:

at the host computer, receiving user data transmitted to the base station from the UE, wherein the UE performs any of the steps of any of the Group A embodiments.

Embodiment 31. The method of the previous embodiment, further comprising, at the UE, providing the user data to the base station.

Embodiment 32. The method of the previous 2 embodiments, further comprising:

at the UE, executing a client application, thereby providing the user data to be transmitted; and at the host computer, executing a host application associated with the client application.

Embodiment 33. The method of the previous 3 embodiments, further comprising:
  at the UE, executing a client application; and
  at the UE, receiving input data to the client application, the input data being provided at the host computer by executing a host application associated with the client application,
  wherein the user data to be transmitted is provided by the client application in response to the input data.

Embodiment 34. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

Embodiment 35. The communication system of the previous embodiment further including the base station.

Embodiment 36. The communication system of the previous 2 embodiments, further including the UE, wherein the UE is configured to communicate with the base station.

Embodiment 37. The communication system of the previous 3 embodiments, wherein:
  the processing circuitry of the host computer is configured to execute a host application;
  the UE is configured to execute a client application associated with the host application, thereby providing the user data to be received by the host computer.

Embodiment 38. A method implemented in a communication system including a host computer, a base station and a user equipment (UE), the method comprising:
  at the host computer, receiving, from the base station, user data originating from a transmission which the base station has received from the UE, wherein the UE performs any of the steps of any of the Group A embodiments.

Embodiment 39. The method of the previous embodiment, further comprising at the base station, receiving the user data from the UE.

Embodiment 40. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).

1xRTT CDMA2000 1x Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
BI Backoff Indicator
BSR Buffer Status Report
CA Carrier Aggregation
Cat-M1 Category M1
Cat-M2 Category M2
CC Carrier Component
CCCH SDU Common Control Channel SDU
CDMA Code Division Multiplexing Access
CE Coverage Enhanced/Enhancement
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
EDT Early Data Transmission
eMTC enhanced Machine-Type Communications
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
IoT Internet of Things
LOS Line of Sight
LPP LTE Positioning Protocol
LTE Long-Term Evolution
M2M Machine-to-Machine
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
MTC Machine-Type Communications
NAS Non-Access Stratum
NB-IoT Narrowband Internet of Things
NPDCCH Narrowband Physical Downlink Control Channel
(N)PRACH (Narrowband) Physical Random Access Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell PCFICH Physical Control Format Indicator Channel
PDCCH Physical Downlink Control Channel
PDP Profile Delay Profile
PDSCH Physical Downlink Shared Channel
PDU Protocol Data Unit
PGW Packet Gateway
PHICH Physical Hybrid-ARQ Indicator Channel
PLMN Public Land Mobile Network
PMI Precoder Matrix Indicator
PRACH Physical Random Access Channel
PRB Physical Resource Block
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RA Random Access
RAPID Random Access Preamble IDentifier
RAN Radio Access Network
RAT Radio Access Technology
RAR Random Access Response
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WI Work Item
WLAN Wide Local Area Network

The invention claimed is:

1. A method performed by a wireless device, the method comprising:

transmitting, in a first message to a network node, an indication that the wireless device has data for transmission as an early data transmission;

obtaining, in a downlink control information, DCI, field of a second message received from the network node, an indication of whether to perform a fallback to a radio resource control, RRC, connection setup or resume procedure, wherein the DCI field comprises one of a modulation and coding scheme, MCS, field and a new data indicator, NDI, field; and based on the indication, determining to perform the fallback to the RRC connection setup or resume procedure and building a third message to transmit to the network node that does not include the data for transmission as the early data transmission.

2. The method of claim 1, wherein in response to determining to perform the fallback to the RRC connection setup or resume procedure the method further comprises transmitting at least one of a RRCConnectionRequest or an RRCConnectionResume.

3. A wireless device comprising:

processing circuitry configured to:

transmit, in a first message to a network node, an indication that the wireless device has data for transmission as an early data transmission;

obtain, in a downlink control information DCI, field of a second message received from the network node, an indication of whether to perform a fallback to a radio resource control, RRC, connection setup or resume procedure, wherein the DCI field comprises one of a modulation and coding scheme, MCS, field and a new data indicator, NDI, field; and based on the indication, determine to perform the fallback to the RRC connection setup or resume procedure and building a third message to transmit to the network node that does not include the data for transmission as the early data transmission.

4. The wireless device of claim 3, wherein in response to determining to perform the fallback to the RRC connection setup or resume procedure, the processing circuitry is further configured to transmit at least one of a RRCConnectionRequest or an RRCConnectionResume.

5. The wireless device of claim 4, wherein the processing circuitry is further configured to:

receive an uplink grant comprising a reduced transport block size, TBS; and transmit the at least one of the RRCConnectionRequest or the RRCConnectionResume based on the reduced TBS.

6. The wireless device of claim 4, wherein the processing circuitry is further configured to:

flush a Msg3 buffer containing data associated with the EDT; and transmit the RRCConnectionRequest or the RRCConnectionResume without the data associated with the EDT.

7. The wireless device of claim 4, wherein when building the third message to transmit to the network node the processing circuitry is further configured to:

rebuild a previously built Msg3 comprising the RRCConnectionRequest or the RCCConnectionResume before transmission.

8. The wireless device of claim 3, wherein the processing circuitry is configured to determine to abort the random access attempt before a contention resolution timer expires.

9. The wireless device of claim 8, wherein the processing circuitry is configured to initiate a new random access attempt after aborting the random access attempt.

10. The wireless device of claim 9, wherein the processing circuitry is configured to select a non-EDT preamble for the new random access attempt.

11. The wireless device of claim 9 wherein the new random access attempt comprises an initiation of a new random access procedure.

12. The wireless device of claim 3, wherein the processing circuitry is configured to adjust a coverage enhancement level of the wireless device for performing the fallback to the RRC connection setup or resume procedure or for initiating a new random access attempt after aborting a random access attempt.

13. The wireless device of claim 3, wherein the processing circuitry is configured to:
   determine a random access Msg3 failure, and wherein the determination to perform the fallback to the RRC connection setup or resume procedure or to abort a random access attempt is performed in response to determining the random access Msg3 failure.

14. A method performed by a network node, the method comprising:
   receiving, in a first message from a wireless device, an indication that the wireless device has data for transmission as an early data transmission; and
   sending, in a downlink control information, DCI, field of a second message, an indication to a wireless device, the indication indicating whether to perform a fallback to a radio resource control, RRC, connection setup or resume procedure, wherein the DCI field comprises one of a modulation and coding scheme, MCS, field and a new data indicator, NDI, field.

15. A network node comprising:
processing circuitry configured to:
receive, in a first message from a wireless device, an indication that the wireless device has data for transmission as an early data transmission; and
   send, in a downlink control information, DCI, field, an indication to a wireless device, the indication indicating whether to perform a fallback to a radio resource control, RRC, connection setup or resume procedure, wherein the DCI field comprises one of a modulation and coding scheme, MCS, field and a new data indicator, NDI, field.

16. The network node of claim 15, wherein the processing circuitry is configured to receive, from the wireless device, at least one of a RRCConnectionRequest or an RRCConnectionResume.

17. The network node of claim 16, wherein the processing circuitry is configured to:
   transmit, to the wireless device, an uplink grant comprising a reduced transport block size, TBS, and wherein the at least one of the RRCConnectionRequest or the RRCConnectionResume is received based on the reduced TBS.

18. The network node of claim 16, wherein the processing circuitry is configured to:
   receive, from the wireless device, the RRCConnectionRequest or the RRCConnectionResume without the data associated with the EDT.

19. The network node of claim 15, wherein the processing circuitry is configured to receive, from the wireless device, a message initiating a new random access attempt.

20. The network node of claim 19, wherein the new random access attempt comprises an initiation of a new random access procedure.

* * * * *